United States Patent
Wong et al.

(10) Patent No.: US 12,519,500 B2
(45) Date of Patent: Jan. 6, 2026

(54) SYSTEM AND METHOD FOR SYNCHRONIZED RECEIVE/TRANSMIT SWITCHING FOR DATA PACKET COMMUNICATION FRAMES TRANSMITTED BETWEEN A WIRELESS INPUT/OUTPUT (IO) DEVICE AND A WIRELESS COMMUNICATION DONGLE

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 350 days.

(21) Appl. No.: 18/229,790

(22) Filed: Aug. 3, 2023

(65) Prior Publication Data
US 2025/0047321 A1 Feb. 6, 2025

(51) Int. Cl.
*H04B 1/44* (2006.01)
*H04L 5/00* (2006.01)

(52) U.S. Cl.
CPC ............. *H04B 1/44* (2013.01); *H04L 5/0078* (2013.01)

(58) Field of Classification Search
CPC .... H04B 1/38; H04B 1/40; H04B 1/44; H04L 5/00; H04L 5/0078; G06F 3/033; G06F 3/038; G06F 13/38; G06F 13/385; G06F 2203/0384
See application file for complete search history.

(56) References Cited

U.S. PATENT DOCUMENTS

| | | | |
|---|---|---|---|
| 7,801,099 B2 | 9/2010 | Desai | |
| 7,853,663 B2 | 12/2010 | Hoerl | |
| 8,364,080 B2 | 1/2013 | Desai | |
| 8,588,758 B2 * | 11/2013 | Ullrich | H04M 1/72412 455/414.1 |
| 8,699,424 B2 | 4/2014 | Chandra | |

(Continued)

FOREIGN PATENT DOCUMENTS

EP 1841149 B1 11/2017

*Primary Examiner* — Quochien B Vuong
(74) *Attorney, Agent, or Firm* — Prol Intellectual Property Law, PLLC; H. Kenneth Prol

(57) ABSTRACT

A wireless input/output (IO) device and dongle synchronized receive/transmit (RX/TX) switching system executing on a wireless IO device comprising a wireless radio system to receive a polling packet from a wireless communication dongle at an information handling system instructing transmission of data packets within a data packet communication frame, the microcontroller to initiate, upon a polling packet detected end of receipt, a first TX ramp up process at the wireless radio system, and set a communication frame transmission timer based on the polling packet, the microcontroller to disable transmission at the wireless radio system, upon a first data packet detected end of transmission, start the radio interrupt callback timer, and upon running of the radio interrupt callback timer, the microcontroller to initiate a second TX ramp up period that concludes at a scheduled initiation of a next allotted time slot for transmission of a second wireless IO device data packet.

20 Claims, 6 Drawing Sheets

(56) References Cited

U.S. PATENT DOCUMENTS

| | | |
|---|---|---|
| 8,913,599 B2 | 12/2014 | Gonikberg |
| 10,949,376 B2 * | 3/2021 | Lee .................. H04L 47/25 |
| 2016/0360526 A1 * | 12/2016 | Lehmann ............ H04L 65/611 |
| 2024/0407017 A1 * | 12/2024 | Chandrasekaran ... H04W 76/10 |

* cited by examiner

SYSTEM AND METHOD FOR SYNCHRONIZED RECEIVE/TRANSMIT SWITCHING FOR DATA PACKET COMMUNICATION FRAMES TRANSMITTED BETWEEN A WIRELESS INPUT/OUTPUT (IO) DEVICE AND A WIRELESS COMMUNICATION DONGLE

FIELD OF THE DISCLOSURE

The present disclosure generally relates to wireless peripheral input/output (IO) devices, such as mice, gaming controller, keyboards, earbuds, headphones, headsets, and virtually reality peripherals. More specifically, the present disclosure relates to a wireless communication from a wireless communication dongle or an information handling system, operating independently from the information handling system operating system (OS) for synchronizing switching between receive and transmit modes, respectively, at the wireless communication dongle and a wireless IO device in wireless communication with the wireless communication dongle to allow for delivery by the wireless IO device of a plurality of wireless IO device data packets consecutively and with minimal delay between transmissions.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, gaming controller, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
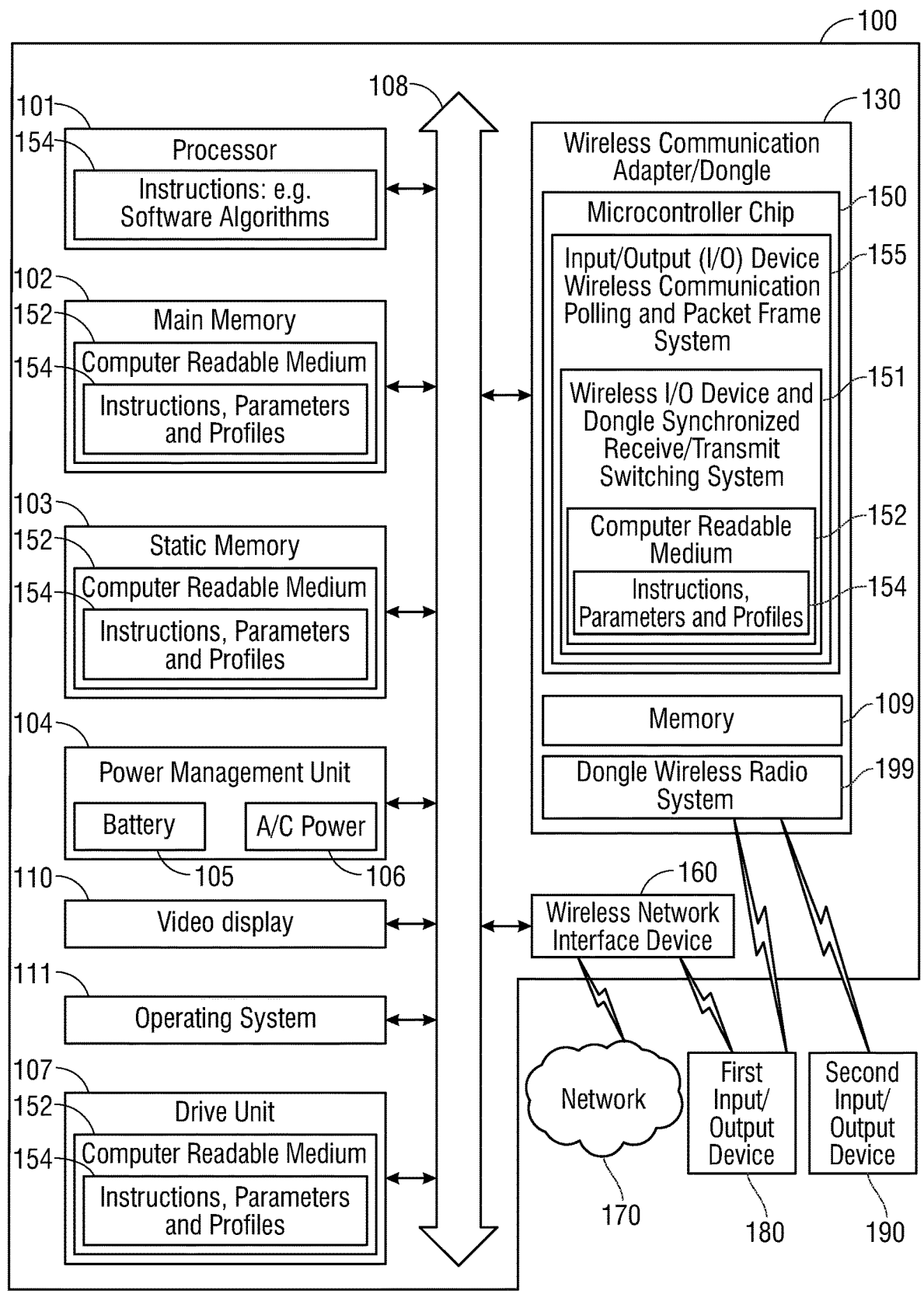
FIG. 1 is a block diagram illustrating an information handling system with a wireless radio system or operatively coupled to a wireless communication dongle orchestrating wireless communication via an input/output (IO) device wireless communication polling and packet frame system with one or more wireless IO devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices (e.g., mouse, touchpad, gaming controller, keyboard, earbuds, headphones, smart speakers, headsets including headphones and speakers, or virtual reality peripherals) located remotely from the information handling system to wirelessly transmit and receive IO data such as keystrokes, mouse positional data, or audiovisual information. Wireless peripheral IO devices are also referred to as wireless IO devices herein. Many existing systems employ a wireless communications dongle operably connected to the information handling system (e.g., desktop, laptop, or tablet computer) to pair with and communicate wirelessly with one or more of these wireless IO devices. In other embodiments, a wireless communication dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities that comply with the Bluetooth® Low Energy (BLE) communication standard.

For example, many existing wireless IO devices are designed to communicate with a wireless communications dongle using a one reception/one transmission (1RX/1TX) format that requires a wireless communications dongle to respond to every data packet received from a wireless IO device by transmitting an acknowledgment (ACK) data packet. In other words, each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Each of these transmission/reception mode switches consumes power, and requires more airtime for acknowledgment (ACK) data packets acknowledging receipt of wireless IO device input data packets at the wireless radio system for the wireless communication dongle or information handling system. Such a 1RX/1TX system may be limited in data throughput, consume power unnecessarily for such transmit and receive switches during operations, and require a certain amount of spacing between transmission of multiple wireless IO device input data packets from the wireless IO device to the wireless communication dongle or information handling system in order to allow for transmission of an ACK data packet in between transmission of such multiple wireless IO device input data packets. Such systems may cause the customer to experience slow response from a wireless IO device, a lag between their input via the wireless IO device (e.g., movement of the mouse) and the corresponding feedback displayed by the information handling system (e.g., movement of the cursor). As a result, existing systems employing this 1RX/1TX approach may fail to meet customer needs during execution of latency-sensitive software applications such as gaming applications or other high definition audio/visual applications.

Existing systems employing this 1RX/1TX approach may also intentionally insert delays between receipt of a first packet and transmission of a second packet in the form of programmed ramp up periods. For example, when a wireless radio system of an existing wireless IO device or wireless communication dongle detects that it has completed reception of a data packet frame, the wireless radio system may disable a receiver, then reenable either a receiver or transmitter, which may initiate a transmission or reception ramp up. Similarly, when a wireless radio system of an existing wireless IO device or wireless communication dongle detects that it has completed transmission of a data packet frame, the wireless radio system may disable the transmitter, then reenable either a receiver or transmitter, which may initiate a receiving or transmission ramp up period. These processes may occur at the wireless communication dongle or information handling system and at the wireless IO device in existing systems. These RX ramp up periods and TX ramp up periods in existing systems may have a duration of up to 40 microseconds in some cases. As such, a data packet communication frame in which a wireless IO device is instructed to transmit four wireless IO device data packets in a row, for example, may include at least 160 microseconds of ramping periods. In many cases, the wireless IO device is also programmed to delay the ramp up period following a detected end of transmission or end of receipt of a data packet in order to ensure proper spacing between data packet transmission/reception within a data packet communication frame. This added delay may further decrease the number of data packets that may be transmitted per second, which is a critical metric for many customers when deciding which wireless IO devices to purchase. Further, in order to ensure that the wireless communication dongle or information handling system is capable of receiving (e.g., receiver enabled and ramped up) at the time of transmission from the wireless IO device of a given data packet, existing systems may add extra delays between data packets. These added delays may ensure that the wireless communication dongle has the needed time to disable the receiver, reenable the receiver, and ramp up as needed in between transmission of wireless IO device data packets.

These additional 160 microseconds or more of spacing time may have a significantly deleterious effect on the dongle or wireless IO device report rate and throughput for gaming or other high-speed wireless IO devices that aim for a report rate of at least 5,000 packets per second, requiring data packet communication frames lasting less around 1,000 microseconds. A system is needed to synchronize delivery of data packets within a data packet communication frame between a wireless IO device and a wireless communication dongle or information handling system that ensures the wireless communication dongle is ready to receive before the wireless IO device transmits, but that also minimizes delay between consecutive transmission or receipt of multiple wireless IO device data packets, and still allows the wireless radio systems of those devices the necessary time to power up receivers or transmitters with ramp up periods upon switching RX/TX modes when that is needed.

Embodiments of the present disclosure employ a customized wireless IO device communication protocol by performing data modulation on wireless IO device data packets transceived using the BLE radio layer protocol in order to allow for transmission of a plurality of data packets from the wireless IO device to the wireless radio system between ACK data packets transmitted from the wireless radio system to the wireless IO device. A controller for a wireless radio system of a wireless communication dongle may execute code instructions, such as firmware, of an IO device wireless communication polling and packet frame system according to embodiments of the present disclosure. The controller for a wireless radio system of a wireless communication dongle or information handling system in embodiments may orchestrate scheduled delivery of a plurality of data packets from each of one or more wireless IO devices in a data packet communication frame between delivery of ACK data packets in a polling packet with instructions for a selected number of data packets and selected data packet length in allotted timeslots to each of one or more wireless IO devices. In embodiments of the present disclosure, a wireless radio adapter, such as in a wireless communications dongle, may transmit a polling packet that instructs each of the wireless IO devices paired with the wireless communications dongle to transmit a selected number of data packets of a selected packet length and at specified time slots during a first data packet communication frame between the wireless communications dongle and each of the paired wireless IO devices.

The controller at the wireless communications dongle may ensure that, during this data packet communication frame in which time slots have been allocated to the one or more wireless IO devices (e.g., mouse and gaming controller), the wireless radio system, such as in the wireless communication dongle, remains in a receive mode to receive a plurality of wireless IO device input data packets from the one or more paired wireless IO devices in accordance with the selected number of packets prescribed and the duration (e.g., based on selected packet lengths) from each of the one or more wireless IO devices. In other words, the controller at the wireless communications dongle may ensure that the wireless radio for that device is ready to receive data before the scheduled transmission of any of the selected number of wireless IO device data packets, as identified within the initial polling packet. In order to achieve this synchronization, the wireless radio system of the wireless communication dongle in embodiments described herein may set the first allotted time slot within an upcoming data packet communication frame to begin a period of time after the end of transmission of the initial polling packet that is greater than the duration of the RX ramp up period for the wireless communication dongle and greater than the duration of the TX ramp up period for the wireless IO device (which may be known to the wireless communication dongle following pairing of the two devices). In some cases, the duration of the RX ramp up period for the wireless communication dongle may be set or programmed to be less than the duration of the TX ramp up period for the wireless IO device in order to ensure that the wireless communication dongle completes the RX ramp up period and is ready to receive prior to completion of the TX ramp up period at the wireless IO device, even when both ramp up periods are triggered by the same event, such as the detected end of transmission of the initial polling packet.

In addition, the controller at the wireless communications dongle executing code instructions of the wireless IO device and dongle synchronized RX/TX switching system and the microcontroller at the wireless IO device executing code instructions of the wireless IO device and dongle synchronized RX/TX switching agent may work in tandem in embodiments of the present disclosure to ensure that the wireless communications dongle or information handling system is always ready to receive wireless IO device data packets prior to transmission of such data packets from the wireless IO device. In embodiments of the present disclosure, the controller at the wireless communications dongle executing code instructions of the wireless IO device and dongle synchronized RX/TX switching system may trigger an end transmission event immediately upon a detected end of receipt of each wireless IO device data packet at the wireless communication dongle or information handling system, which may further trigger a registered, programmed, subscribed, or scheduled interrupt callback routine that overrides a command to disable the receiver. By interrupting the disable command in such a way in embodiments herein, the controller at the wireless communications dongle executing code instructions of the wireless IO device and dongle synchronized RX/TX switching system may ensure that the wireless communication dongle or information handling system does not undergo an RX ramp up in between receipt of wireless IO device data packets. As such, the wireless communication dongle or information handling system may be immediately capable of receiving a next data packet during a period of time in between receipt of wireless IO device data packets in which the wireless IO device is undergoing a mandatory TX ramp up process. Skipping the RX ramp up process at the wireless communication dongle or information handling system while the wireless IO device is undergoing a TX ramp up process of roughly 40 microseconds or more may ensure that the wireless communication dongle or information handling system is ready to receive at least 40 microseconds (or the duration of the TX ramp up process at the wireless IO device) before the next wireless IO device data packet is transmitted. In fact, this omission of the RX ramp up process at the wireless communication dongle or information handling system may afford the wireless communication dongle or information handling system enough time in embodiments to read wireless IO device data packet payloads into memory from the data buffer in between receipts of wireless IO device data packets.

Embodiments of the present disclosure may also decrease unnecessary delay between consecutive transmission or receipt of multiple wireless IO device data packets within an orchestrated data packet communication frame. As described herein, in existing systems, the wireless communication dongle or information handling system may undergo the TX ramp up that the current disclosure or omits in between each wireless IO device data packet transmission. Those existing systems may add extra delays between data packets, in order to ensure that the wireless communication dongle or information handling system is capable of receiving (e.g., receiver enabled and ramped up) at the time of transmission from the wireless IO device of a given data packet, existing systems may. Because the wireless communication dongle or information handling system in embodiments of the present disclosure do not allow the receiver to enter a disabled state or to perform an RX ramp up in between such data packets, these added or extra delays or no longer necessary. Thus, the microcontroller at the wireless IO device executing code instructions of the wireless IO device and dongle synchronized RX/TX switching agent to minimize or remove these unnecessary delays.

The wireless IO device and dongle synchronized RX/TX switching system and agent may avoid such unnecessary delays at the wireless IO device in between such consecutive transmissions or receipts of those multiple wireless IO device data packets by omitting a programmed delay between a detected end of transmission of a data packet and disabling of the transmitter at the wireless IO device. Upon disabling of the transmitter, the transmitter may be reenabled almost immediately thereafter (e.g., about one microsecond later in some embodiments), which may trigger initiation of a TX ramp up period of about 40 microseconds. As described herein, execution of this TX ramp up period at the wireless IO device in between transmissions of each of the wireless IO device data packets within a data packet communication frame may give the wireless communication dongle or information handling system time to read data from the buffer and be ready to receive before the wireless IO device has completed its mandatory TX ramp up period. Thus, no delay between detected end of transmission of a data packet at the wireless IO device and disabling of the transmitter is needed in order to synchronize transmission and receipt of data packets between the wireless IO device and the communications dongle or information handling system.

As described herein, the controller for a wireless radio system of a wireless communication dongle or information handling system in embodiments may orchestrate scheduled delivery of a plurality of data packets from each of one or more wireless IO devices in a data packet communication frame by instructing the wireless IO device to transmit a selected number of data packets in allotted timeslots. In order to ensure that each wireless IO device data packet is transmitted within its allotted timeslot of a given data packet communication frame in embodiments, the microcontroller of a wireless IO device may execute code instructions of a wireless IO device and dongle synchronized RX/TX switching agent to ensure the TX ramp up process is completed in such a way that allows for transmission of the next data packet within its allotted time slot. The microcontroller of a wireless IO device may execute code instructions of a wireless IO device and dongle synchronized RX/TX switching agent in embodiments herein may set a radio interrupt callback timer that may delay the TX ramp up process execution in between transmission of data packets. This may ensure that the TX ramp up process does not conclude until the allotted time slot for the next data packet occurs. The adjustable radio interrupt callback timer in embodiments described herein may be set or programmed to have a duration of any value greater than one microsecond.

The wireless IO device and dongle synchronized RX/TX switching system and agent in embodiments of the present disclosure may also allow the wireless radio systems of those devices to have the necessary time to power up receivers or transmitters upon switching RX/TX modes such as at the end of a polling packet or end of a data packet communication frame. For example, the initial polling packet in embodiments described herein may also set a communication frame transmission timer duration that triggers switching of the wireless radio system RX/TX modes upon its expiration. This communication frame transmission timer may have a higher priority than the radio interrupt callback timer described directly above, such that expiration of the communication frame transmission timer triggers the wireless radio system to switch RX/TX modes even if the radio interrupt callback timer is running upon expiration of the communication frame transmission timer. This essentially initiates the RX/TX mode switch before the controller at the wireless communication dongle or the microcontroller at the wireless IO device can begin the respective RX or TX ramp up processes at these devices. The communication frame transmission timer in embodiments herein may be initiated upon the detected end of transmission or receipt of the initial polling packet and may be set to terminate at a detected end of transmission of the last selected number of wireless IO data packets in a data packet communication frame, as defined within the initial polling packet. In such a way, the wireless IO device and dongle synchronized RX/TX switching system in embodiments herein may ensure that, following completion of each data packet communication frame, the wireless communication dongle switches from an RX mode to a TX mode to transmit an updated polling packet for the next data packet communication frame. The wireless IO device and dongle synchronized RX/TX switching agent in embodiments herein may also ensure that, following completion of each data packet communication frame, the wireless IO device switches from a TX mode to an RX mode to receive such an updated polling packet for the next data packet communication frame.

FIG. 1 illustrates an information handling system 100 according to several aspects of the present disclosure. As described herein, an information handling system 100 or a controller 150 of a wireless communications dongle or integrated wireless radio adapter 130 operably connected to the information handling system 100 may execute code instructions of an input/output (IO) device wireless communication polling and packet frame system 155 to orchestrate scheduled delivery of a plurality of wireless IO device data packets from each of one or more paired wireless input/output (IO) devices (e.g., 180 and 190) during scheduled data packet communication frames. As also described herein, the controller 150 may execute code instructions of the wireless IO device and dongle synchronized RX/TX switching system 151 in an embodiment to ensure that, following completion of each orchestrated data packet communication frame, the wireless communication dongle or integrated wireless radio adapter 130 switches from a receive (RX) mode to a transmit (TX) mode to transmit an updated polling packet for the next data packet communication frame, and to decrease delay between consecutive transmission or receipt of multiple wireless IO device data packets within an orchestrated data packet communication frame between the wireless communication dongle or integrated wireless radio adapter 130 and one or more wireless IO devices (e.g., 180 or 190).

It is appreciated that information handling system 100 may use a wireless communications dongle or integrated wireless radio adapter 130 to wirelessly communicate with one or more wireless IO devices 180 or 190. In embodiments herein, wireless communications dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications dongle 130, whether integrated or not within the information handling system 100 may operate using Bluetooth® Low Energy (BLE) radio layer protocol (e.g., BLE radio with Gaussian Frequency Shift Keying (GFSK) data modulation), as modified with the wireless IO device communication protocol of embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices such as static memory 103 or drive unit 107, a wireless network interface device 160, and one or more communications ports for communicating with external devices such as wireless communication adapter/dongle 130 (referred to herein as a wireless communications dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The wireless communication dongle 130 or integrated wireless radio adapter in an embodiment may house a microcontroller 150 executing firmware instructions of the IO device wireless communication polling and packet frame system 155 and the wireless IO device and dongle synchronized RX/TX switching system 151 in an embodiment. The wireless communication dongle 130 may be operatively coupled to the information handling system 100 through insertion of the wireless communication dongle 130 within a Universal Serial Bus (USB) port of the information handling system 100 in an embodiment, for example. In another embodiment, the wireless communication dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art.

The wireless communication dongle 130 in an embodiment may be wirelessly coupled to one or more wireless input output (IO) devices 180 and 190 capable of wirelessly receiving and transmitting data via Bluetooth® Low Energy (BLE) radio layer protocol (e.g., BLE radio with Gaussian Frequency Shift Keying (GFSK) data modulation), as modified with the wireless IO device communication protocol of embodiments herein, with the wireless communication adapter/dongle 130. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication dongle wireless radio system 199 or other integrated wireless radio adapter in an embodiment may be capable of communication between the information handling system 100 and the paired wireless IO devices 180 and 190 using a wireless link established using Bluetooth® Low Energy (BLE) radio layer protocol (e.g., BLE radio with Gaussian Frequency Shift Keying (GFSK) data modulation) as modified with the wireless IO device communication protocol of embodiments herein, for example. The wireless communication dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number. Such pairing or wireless communication profiles in an embodiment may also include a set or programmed duration of one or more ramp up processes for the wireless IO devices (e.g., 180 and 190), such as a TX disable delay duration and a TX ramp up duration for powering up a transmitter upon switching to a TX mode or an RX ramp up duration for powering up a receive upon switching to an RX mode.

The wireless communication dongle wireless radio system 199 may provide connectivity of the wireless communication dongle 130 operatively coupled to the information handling system 100 via wireless links to one or more operatively coupled wireless input/output devices 180 or 190, such as mouse, keyboard, gaming controller, earbuds, headphones, smart speakers, or virtual reality peripherals, as described in greater detail herein. Such wireless links may be established pursuant to BLE radio layer protocol, for example. In some embodiments, BLE radio layer protocol with GFSK data modulation as modified with the wireless IO device communication protocol of embodiments herein may be used to establish a Private Area Network (PAN) (e.g., 170) in which the information handling system 100 may communicate wirelessly with any wireless IO devices (e.g., 180 and 190) paired to the PAN 170 using a BLE radio layer protocol (e.g., BLE radio with GFSK data modulation) compliant pairing and wireless communication profile. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHZ. Reference to Bluetooth® may refer to either or both of the Bluetooth® or Bluetooth Low Energy (BLE) and any revision of those protocols.

In some aspects of the present disclosure, the wireless communication dongle wireless radio system 199 may operate two or more wireless links. In other aspects of the present disclosure, the wireless communication dongle 130 may include a plurality of wireless communication dongle wireless radio systems, each capable of establishing a separate wireless link to one of the plurality of wireless IO devices (e.g., 180 or 190), such that the wireless communication dongle 130 may be in communication with a plurality of wireless IO devices (e.g., 180 and 190) via a plurality of wireless links.

The wireless communication dongle wireless radio system 199 may also operate in accordance with any Bluetooth® data communication standards, as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication dongle wireless radio system 199 may communicate voice, video or data to the wireless communication dongle 130. The wireless communication dongle 130 may include a set of instructions 154 that may be executed via a microcontroller 150, for example, to cause the wireless communication dongle 130 to perform any one or more of the methods or computer-based functions disclosed herein. For example, instructions 154 may include a particular example of an IO device wireless communication polling and packet frame system 155, a wireless IO device and dongle synchronized RX/TX switching system 151 or other aspects or components. Application instructions 154 may also include any application processing drivers, or the like executing on information handling system 100 or wireless communication dongle 130.

The IO device wireless communication polling and packet frame system 155 or the wireless IO device and dongle synchronized RX/TX switching system 151 may utilize a computer-readable medium 152 in which one or more sets of instructions 154 may operate in part as firmware instructions executed by microcontroller 150 on the wireless communication dongle 130. The instructions 154 may embody one or more of the methods as described herein. For example, instructions relating to the IO device wireless communication polling and packet frame system 155, the wireless IO device and dongle synchronized RX/TX switching system 151, firmware, processes, and/or methods may be stored here. More specifically, instructions 154 may be executed by microcontroller integrated circuit 150 or other processing resources such as an embedded controller (EC) or the processor 101 to orchestrate transmission of wireless IO device data packets from one or more wireless IO devices 180 and 190 with the wireless communication dongle 130 during a data packet communication frame according to embodiments herein. In other embodiments, the instructions 154 may be executed via a controller within the integrated wireless network interface device or wireless radio adapter 160 of the information handling system 100.

Memory 109 located and controlled by the wireless communication dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the IO device wireless communication polling and packet frame system 155 or the wireless IO device and dongle synchronized RX/TX switching system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication dongle 130 and one or more of wireless IO devices (e.g., 180 and 190), the microcontroller 150 may execute code instructions 154 of the IO device wireless communication polling and packet frame system 155 and wireless IO device and dongle synchronized RX/TX switching system 151 to orchestrate transmission of a plurality of wireless IO device data packets from one or more of the wireless IO devices (e.g., 180 or 190) during one or more data packet communication frames, as described in embodiments herein.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
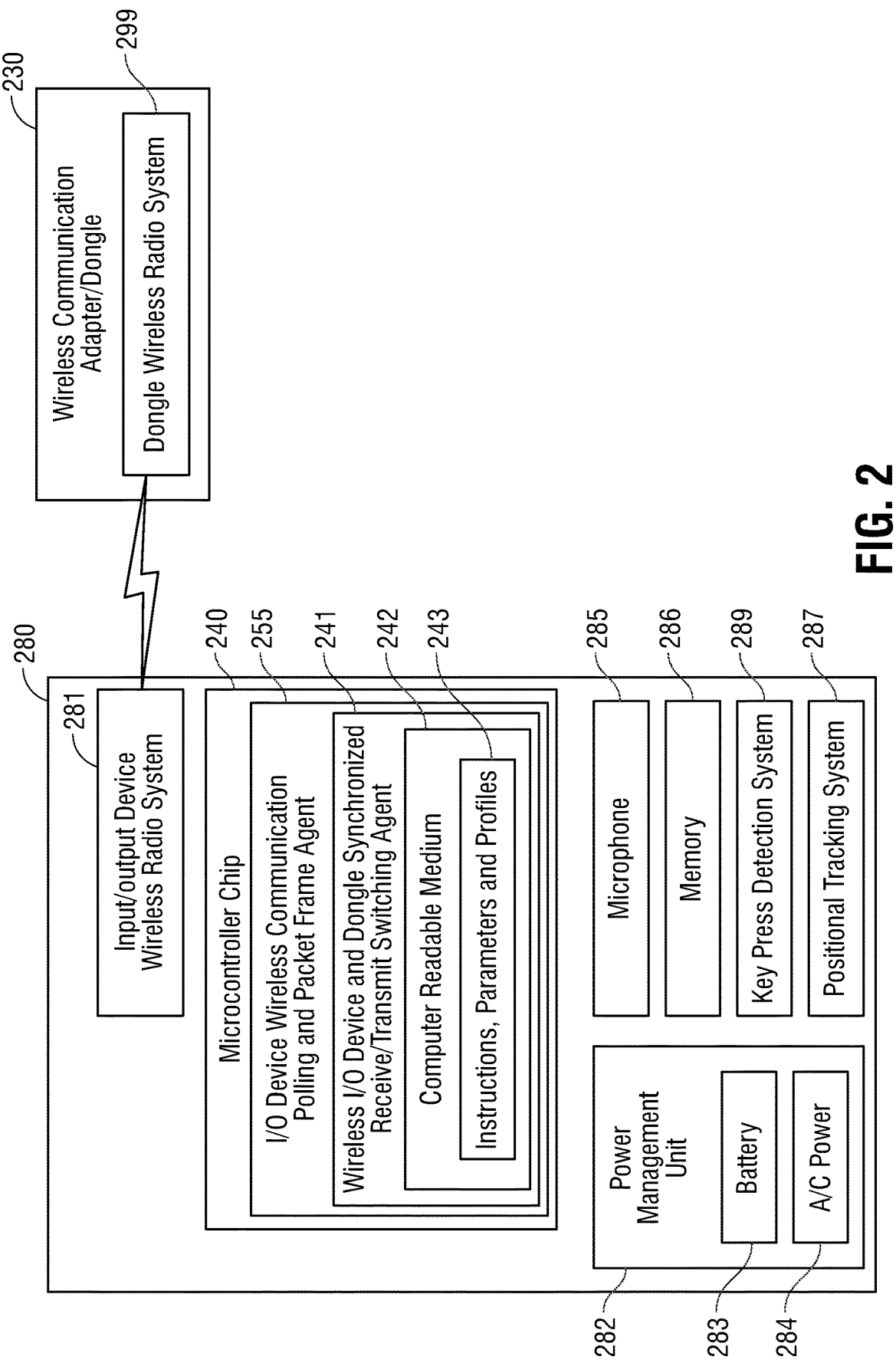
FIG. 2 is a block diagram illustrating a wireless IO device wirelessly paired to a wireless radio adapter or a wireless communication dongle that is operatively coupled to an information handling system according to an embodiment of the present disclosure.

FIG. 2 is a graphical diagram illustrating a wireless communication dongle 230 wirelessly paired to a wireless input/output (IO) device 280 according to an embodiment of the present disclosure. As described herein, the microcontroller 240 may execute code instructions of the wireless IO device and dongle synchronized RX/TX switching agent 241 in an embodiment to ensure that, following completion of each orchestrated data packet communication frame, the wireless IO device 280 switches from a transmit (TX) mode to a receive (RX) mode to receive an updated polling packet for the next data packet communication frame, and to decrease delay between consecutive transmissions of multiple wireless IO device data packets within an orchestrated data packet communication frame.

As also described previously, the wireless communication dongle 230 may be a dongle device paired to an information handling system or integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the speaker 288, the microphone 285, or other components of the wireless IO device 280. In an embodiment, the wireless IO device 280 may include a microcontroller chip 250 that may be any device or devices that execute instructions, parameters, and profiles 243 of an IO device wireless communication polling and packet frame agent 255 and the wireless IO device and dongle synchronized RX/TX switching agent 241 at the wireless IO device 280 to transmit wireless IO device data packets from the wireless IO device 280 to the wireless communication dongle 230 during a data packet communication frame according to orchestrating instructions received from the wireless communication dongle 230.

As described herein, the wireless communication dongle 230 in an embodiment may include a controller executing code instructions of an IO device wireless communication polling and packet frame system 255 to orchestrate transmission of plural wireless IO device data packets from one or more paired wireless IO devices (e.g., 280) during any data packet communication frame. Such an orchestration may be initiated by transmission from the dongle wireless radio system 299 to the IO device wireless radio system 281 of one or more polling packets to each elicit plural data packets, as described herein. The IO device wireless communication polling and packet frame agent 255 and the wireless IO device and dongle synchronized RX/TX switching agent 241 of the wireless IO device 280 may operate to generate wireless IO device data packets and to instruct the IO device wireless radio system 281 to transmit those data packets within a synchronized data packet communication frame between the wireless communication dongle 230 and the wireless IO device 280 according to the instructions in received polling packets having coordinating instructions as to number of packets, packet lengths, and time slots to be used.

The IO wireless radio system 281 in an embodiment may be capable of communication between the wireless IO device 280 and the wireless communication dongle 230 using a wireless link established under Bluetooth® or Bluetooth Low Energy (BLE) radio layer protocols (e.g., with Gaussian Frequency Shift Keying (GFSK) data modulation) as modified with the wireless IO device communication protocol of embodiments herein, for example. The IO device wireless radio system 281 may provide connectivity of the wireless IO device 280 to the wireless communication dongle 230, external or integrated, and is operatively coupled to the information handling system via one or more wireless links. Such wireless links may be established pursuant to BLE radio layer protocols (e.g., with Gaussian Frequency Shift Keying (GFSK) data modulation) as modified with the wireless IO device communication protocol of embodiments herein, for example. The IO device wireless radio system 281 may operate in accordance with any Bluetooth® data communication standards or BLE radio layer protocols (e.g., with Gaussian Frequency Shift Keying (GFSK) data modulation) as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication dongle 230, integrated or operatively coupled to the information handling system. In an embodiment in which the wireless IO device 280 comprises a mouse, the wireless IO device 280 may further include a position tracking system 287 capable of recording or tracking changes in position of the mouse with respect to the wireless communication dongle 230, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication dongle 230. This positional information for the mouse or correlated changes to cursors or other graphical representations at the information handling system may be transmitted as data packets to the dongle wireless radio system 299 as described herein. In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. In yet another embodiment in which the wireless IO device 280 comprises a headset or earbuds, for example, the wireless IO device 280 may further include a microphone 285 for recording of audio user input. Such audio user input in an embodiment may be transmitted as data packets to the dongle wireless radio system 299 as described herein.

Instructions 243 of the IO device wireless communication polling and packet frame agent 255 and the wireless IO device and dongle synchronized RX/TX switching agent 241 may be executed by the microcontroller chip 250, for example a controller integrated circuit, to transmit such wireless IO device data packets to the wireless communication dongle 230 at an information handling system pursuant to polling packets generated at the IO device wireless communication polling and packet frame system operating at the wireless communication dongle 230 and transmitted to the wireless IO device 280. Such instructions 243 of the IO device wireless communication polling and packet frame agent 255 and the wireless IO device and dongle synchronized RX/TX switching agent 241 may include instructions for transmission of wireless IO device data packets by the IO device wireless radio system 281 of a selected data packet number, having a selected data packet length, at allotted data packet transmission time slots, as identified within polling packets received at the wireless IO device 280 from the wireless communication dongle 230.

The polling packet transmitted by the controller for the wireless communication dongle 230 in an embodiment may define a selected number of wireless IO device data packets (e.g., six) and a wireless IO device data packet length (e.g., in bytes) that instructs the number and length of data packets the wireless IO device 280 should transmit to the wireless communication dongle 230 during wireless IO device allotted time slots within the next data packet communication session. Identifying information for the wireless IO device 280 may be stored in memory 286 in an embodiment and transmitted in a header with any wireless IO device data packets for each type of wireless IO device data bytes therein. Such identifying information in an embodiment may operate to identify the wireless IO device 280 type and further indicate to the wireless communication dongle 230 the TX disable delay duration, TX ramp up duration or RX ramp up duration currently set at the wireless IO device 280, for example. The identifying information may also operate to identify the wireless IO device as a device authorized to transceive data with the dongle 230, as well as information sufficient to identify the wireless IO device 280, such as a Media Access Control (MAC) address, IP address, or model number.

The wireless IO device 280 may, in some embodiments include a processing resource such as a microcontroller 240. Any of the processing resources described herein may be used and may operate to execute code that is either firmware or software code. Instructions 243 may include an IO device wireless communication polling and packet frame agent 255 and the wireless IO device and dongle synchronized RX/TX switching agent 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the computer system such as the wireless IO device 280 to perform any one or more of the methods or computer-based functions disclosed herein. For example, instructions 243 may include a particular example of an IO device wireless communication polling and packet frame agent 255 and the wireless IO device and dongle synchronized RX/TX switching agent 241, or other firmware or software.

The IO device wireless communication polling and packet frame agent 255 and the wireless IO device and dongle synchronized RX/TX switching agent 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the IO device wireless communication polling and packet frame agent 255 and the wireless IO device and dongle synchronized RX/TX switching agent 241 may operate in part as software or firmware instructions executed on the wireless IO device 280. The instructions 243 may embody one or more of the methods as described herein. For example, instructions relating to the IO device wireless communication polling and packet frame agent 255 and the wireless IO device and dongle synchronized RX/TX switching agent 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the IO device wireless communication polling and packet frame agent 255 and the wireless IO device and dongle synchronized RX/TX switching agent 241 may be stored in memory 286 on a computer-readable medium 242 such as a flash memory or magnetic disk in an example embodiment.

Figure 3:
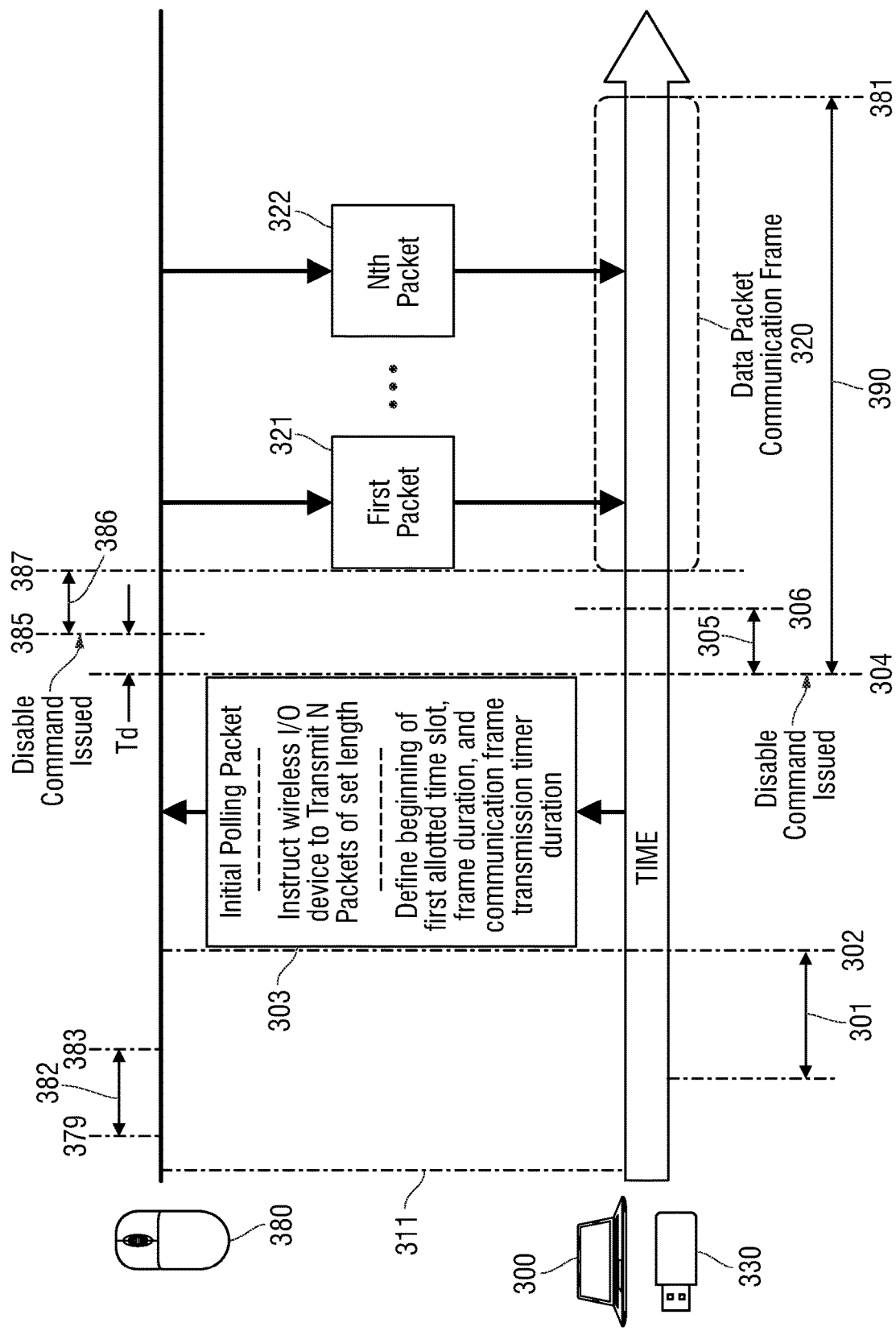
FIG. 3 is a block diagram illustrating orchestrating transmission and receipt of a polling packet and a data packet communication frame between a wireless communications dongle and a wireless IO device according to an embodiment of the present disclosure.

FIG. 3 is a block diagram illustrating generating and orchestrating transmission and receipt of a polling packet and a data packet communication frame for communication between a wireless communications dongle or integrated wireless radio system and a paired wireless input/output (IO) device according to an embodiment of the present disclosure. The microcontroller of the wireless communications dongle 330 or integrated wireless radio system of information handling system 300 executes code instructions of the IO device wireless communication polling and packet frame system according to an embodiment of the present disclosure. As described herein, the IO device wireless communication polling and packet frame system executing at an information handling system 300 or via a controller within a wireless communications dongle 330 operably connected to the information handling system 300 in an embodiment may schedule receipt of a plurality of data packets (e.g., 321 to 322) of a specified number (N) from one or more paired wireless IO devices (e.g., mouse 380) between delivery of polling packets (e.g., 303). For case of explanation, the IO device wireless communication polling and packet frame system in various embodiments herein may be described as executing at the wireless communications dongle 330 in some embodiments herein. However, it is also contemplated that the IO device wireless communication polling and packet frame system may operate internally within an integrated wireless radio system of the information handling system 300 in an embodiment. Further, an IO device wireless communication polling and packet frame agent and a wireless IO device and dongle synchronized RX/TX switching agent may operate at the wireless IO device (e.g., mouse 380) in various embodiments herein. In any such embodiments, the wireless communication dongle 330 or integrated wireless radio system is capable of establishing wireless links with the wireless IO device 380 according to the Bluetooth® or Bluetooth® Low Energy (BLE) communications protocols, or according to BLE radio layer protocol (e.g., BLE radio with Gaussian Frequency Shift Keying (GFSK) data modulation), as modified according to the wireless IO device communication protocol of embodiments herein.

At time 311 in an embodiment, the wireless communication dongle 330 or information handling system 300 may transmit and receive information necessary to pair the wireless IO device 380 with the wireless communication dongle 330 or information handling system 300, such as, for example, pairing or wireless communication profiles for pairing the wireless communication dongle 330 or information handling system 300 and the wireless IO device 380. Such pairing or wireless communication profiles may operate to identify the wireless IO device 380 as a device authorized to transceive data with the wireless communication dongle 330 or information handling system 300 under the paired wireless protocol, as well as information sufficient to identify the wireless IO device 380, such as a Media Access Control (MAC) address, IP address, or model number. Such pairing or wireless communication profiles in an embodiment may also include a set or programmed duration of one or more ramp up processes for the wireless IO device 380, such as a TX ramp up duration for powering up a transmitter upon switching to a TX mode or an RX ramp up duration for powering up a receive upon switching to an RX mode.

In an embodiment, the wireless IO device 380 may be placed in a receive (RX) mode at 379 for receipt of an initial polling packet 303 transmitted from the wireless communications dongle 330 or the information handling system 300. As described herein, when the wireless radio system for the wireless IO device 380 switches between RX and TX mode, or upon initial power up, the wireless IO device radio system may undergo an initial ramp up process (e.g., 382) in which the receiver or transmitter powers up to a state in which it is ready to receive or transmit data (e.g., at least 90% of power capacity). Upon completion of the RX ramp up process 382, the wireless IO device 380 may be ready to receive at 383.

During this same time period, the wireless communication dongle 330 or information handling system 300 in an embodiment may be placed in a transmit (TX) mode at time 301 for transmission of the initial polling packet 303 to the wireless IO device 380. At time 302, following the TX ramp up period between time 301 and time 302, the wireless communication dongle 330 or the information handling system 300 wireless IO device radio may be ready to transmit, for example, to transmit an initial polling packet 303. The controller of the wireless communications dongle 330 or the information handling system 300 integrated wireless radio system executing code instructions of the IO device wireless communication polling and packet frame system in an embodiment may generate an initial polling packet 303 that instructs each of the wireless IO devices (e.g., 380) paired with the wireless communications dongle 330 or the information handling system 300 to transmit a selected number of wireless IO device data packets (e.g., N) of a selected data packet length and at specified allotted time slots during a first data packet communication frame 340 between the wireless communications dongle 330 or the information handling system 300 and each of the paired wireless IO devices (e.g., 380). The initial polling packet 303 in an embodiment may also thus provide a time for the end of the data packet communication frame 320. As described herein, the initial polling packet in an embodiment may also include a communication frame transmission timer duration 390 that triggers switching of the wireless radio system RX/TX modes upon its expiration. This communication frame transmission timer duration 390 may trigger the wireless radio system of the wireless communication dongle 330, information handling system 300, or wireless IO device 380 to switch RX/TX modes before the controller at the wireless communication dongle 330 or information handling system 300 or the microcontroller at the wireless IO device 380 can reenable transmission or reception at those devices after it expires at the detected end transmission time 381 of the last data packet 322 at the end of a data packet communication frame 320.

At 302, the wireless radio system for the wireless communications dongle 330 or information handling system 300 may begin transmission of the initial polling packet 303 to the wireless IO device 380. The wireless IO device radio system for the wireless IO device 380 may detect the end of receipt of the initial polling packet 303 at time 302, prompting the microcontroller executing code instructions of the wireless IO device and dongle synchronized RX/TX switching agent to instruct the wireless radio agent of the wireless IO device 380 to switch from the RX mode to the TX mode for transmission of wireless IO device data packets within the data packet communication frame 320. The wireless dongle radio system for the wireless communications dongle 330 or information handling system 300 may detect the end of the transmission of the initial polling packet 303 at 304, prompting the controller executing code instructions of the wireless IO device and dongle synchronized RX/TX switching system to instruct the wireless dongle radio system of the wireless communications dongle 330 or information handling system 300 to switch from the TX mode to the RX mode for receipt of wireless IO device data packets within the data packet communication frame 320. The detected end of receipt of the polling packet 303 at time 304, detected by the wireless IO device radio, may also trigger the communication frame transmission timer duration 390 at the wireless IO device 380. The polling packet end of transmission 304 of the polling packet 303 may trigger the communication frame transmission timer duration 390 at the wireless communication dongle 330 which ends at the detected end of reception 381 of the last data packet 322 of the data packet communication frame 320.

The controller at the wireless communications dongle 330 or information handling system 300 may execute code instructions of the wireless IO device and dongle synchronized RX/TX switching system to ensure that the wireless radio for the wireless communications dongle 330 or information handling system 300 is ready to receive data before the scheduled transmission of any of the selected number of wireless IO device data packets (e.g., 321 to 322), as identified within the initial polling packet 303. In order to achieve this synchronization, the wireless radio system of the wireless communication dongle 330 or information handling system 300 in an embodiment may set the first allotted time slot within an upcoming data packet communication frame 320 to begin at 387, a period of time after the end of transmission of the initial polling packet 303 that is greater than the duration 305 of the RX ramp up process for the wireless communication dongle 330 or information handling system 300 and greater than the duration 386 of the TX ramp up process for the wireless IO device 380 (which may be known to the wireless communication dongle 330 or information handling system 300 following pairing of the two devices).

As described herein, in some existing systems, the wireless IO device 380 may have a pre-programmed disable delay timer (Td) that can be adjusted or modified, and may delay disabling of the receiver at 385 to disable the receiver or transmitter after a detected end of transmission or reception (e.g., at 304) of a data packet. In existing systems in which the wireless communication dongle 330 or information handling system 300 undergoes an RX ramp up in between receipt of each of the data packets (e.g., 321, 322, to 323), this disable delay timer may ensure that the wireless communication dongle 330 or information handling system 300 is ready to receive (e.g., has completed the RX ramp up) at the time 387 when the first data packet 321 is ready to be transmitted from the wireless IO device 380. Because the wireless communication dongle 330 or information handling system 300 in an embodiment may not undergo such an RX ramp up in between receipt of each of the data packets (e.g., 321, 322, 323), this disable delay timer is no longer required or necessary to ensure such synchronization. Thus, the controller for the wireless communication dongle 330 or information handling system 300 executing code instructions for the wireless IO device and dongle synchronized RX/TX switching system in an embodiment may work in tandem with the microcontroller of the wireless IO device 380 executing code instructions of the wireless IO device and dongle synchronized RX/TX switching agent to set the duration of the disable delay timer (Td) to a value of zero during a pairing process occurring at 311 to further reduce delay in transmitting a data packet communication frame 320.

At the time specified within the initial polling packet 303 in an embodiment, the data packet communication frame 320 may begin with receipt of a first wireless IO device data packet 321 responsive to the initial polling packet 303 from the wireless IO device 380 at data packet communication frame start time 387. In an embodiment, the first packet 321 for the data packet communication frame 320 may adhere to the instructions received within the initial polling packet 303. For example, in an embodiment, the first packet 321 may have a length equivalent to the wireless IO device data packet length defined in the initial polling packet 303 and may be delivered at the synchronized time (e.g., 387). Data packet communication frame start time 387 designates the beginning of the data packet communication frame 320 within the first of N wireless IO device allotted data packet transmission time slots, as defined within the initial polling packet 303.

Figure 4:
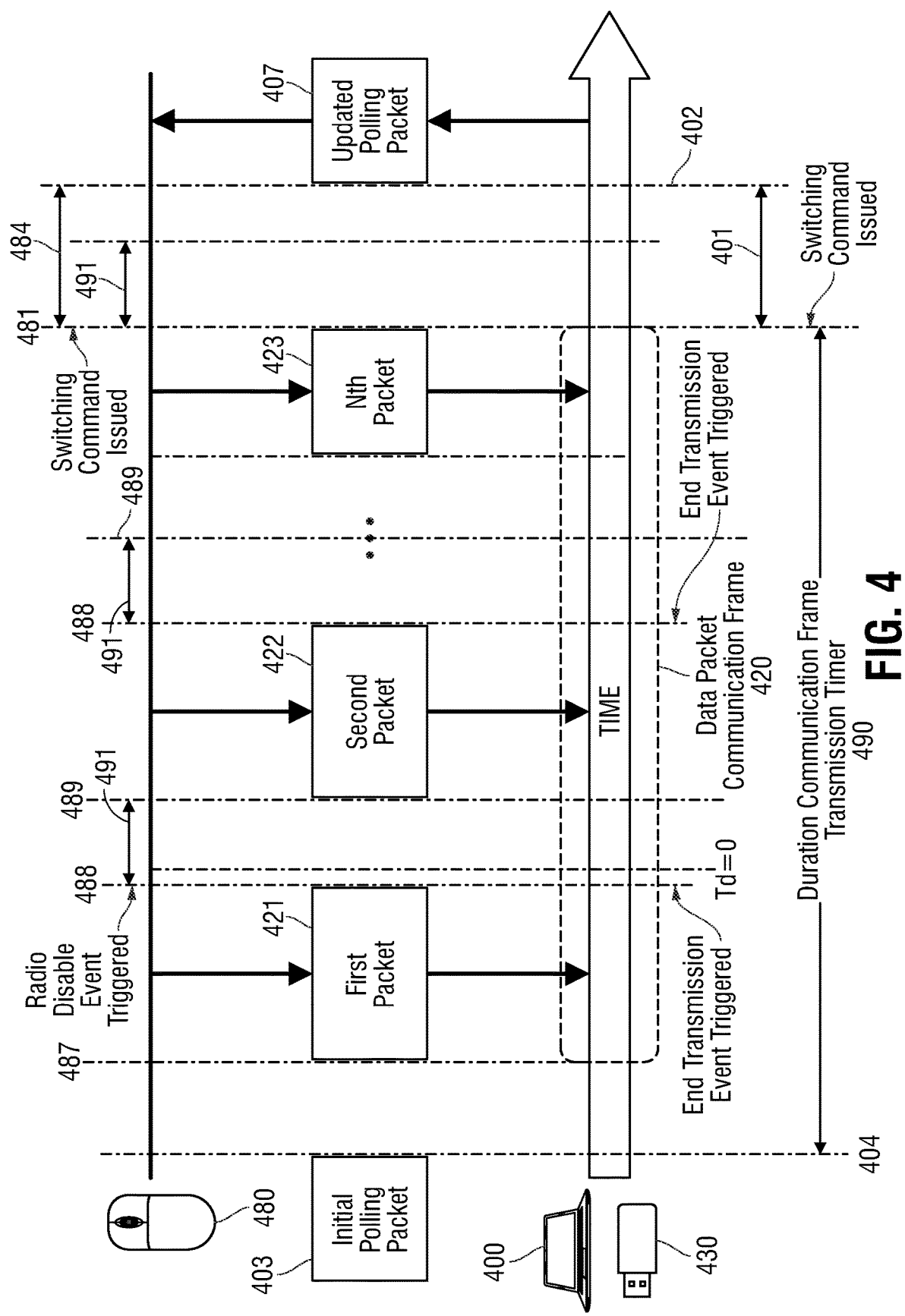
FIG. 4 is a block diagram illustrating synchronized transmission and receipt of wireless IO device data packets within a data packet communication frame between a wireless communications dongle and a wireless IO device according to an embodiment of the present disclosure.

A microcontroller executing code instructions of the IO device wireless communication polling and packet frame system at the wireless communications dongle 330 or the information handling system 300 may ensure that, during this data packet communication frame 320, the wireless radio system remains in a receive mode to receive wireless IO device data packets (e.g., 321 to 322) from the one or more paired wireless IO devices (e.g., 380) during the anticipated duration of the data packet communication frame 320, as described in greater detail below with respect to FIG. 4. In other words, the controller of the wireless communications dongle 330 or the information handling system 300 may avoid any power loss or data rate transmission delay due to rapid switching between RX/TX modes during this data packet communication frame 320. During the data packet communication frame 320 in an embodiment, the wireless radio system of the wireless communication dongle 330 or the information handling system 300 may receive a plurality of wireless IO device data packets (e.g., 321 to 322) equivalent to the selected wireless IO device data packet number (N) as defined within the initial polling packet 303.

FIG. 4 is a block diagram illustrating synchronized transmission and receipt of wireless IO device data packets within a data packet communication frame for communication between a wireless communications dongle or integrated wireless radio system and a paired wireless input/output (IO) device according to an embodiment of the present disclosure. As described herein, a microcontroller executing code instructions of the IO device wireless communication polling and packet frame system at the wireless communications dongle 430 or the information handling system 400 may ensure that, during a data packet communication frame 420, the wireless radio system of the wireless communication dongle 430 or information handling system 400 remains in a receive (RX) mode to receive wireless IO device data packets (e.g., 421 to 422) from the one or more paired wireless IO devices (e.g., 480) during the anticipated duration of the data packet communication frame 420. As also described herein, detection of a wireless radio system of an existing wireless communication dongle of an end transmission event upon detection that reception of a data packet has been completed, the wireless radio system may trigger a registered, programmed, subscribed, or scheduled interrupt callback routine to disable the receiver for the wireless communication dongle, which may avoid an unnecessary transmission ramp up and make the wireless communication dongle 430 or information handling system 400 immediately ready to receive further wireless IO device data packets (e.g., 422 or 423).

A controller at the wireless communications dongle 430 or information handling system 400 executing code instructions of the wireless IO device and dongle synchronized RX/TX switching system and a microcontroller at the wireless IO device 480 executing code instructions of the wireless IO device and dongle synchronized RX/TX switching agent in an embodiment may work in tandem to ensure that the wireless communications dongle 430 or information handling system 400 is always ready to receive wireless IO device data packets (e.g., 421, 422, 423) prior to transmission of such data packets from the wireless IO device 480. As described herein, when a wireless radio system of an existing wireless IO device or wireless communication dongle detects that it has completed reception of a data packet frame, the wireless radio system may disable a receiver, then reenable either a receiver or transmitter, which may initiate a transmission or reception ramp up. Similarly, when a wireless radio system of an existing wireless IO device or wireless communication dongle detects that it has completed transmission of a data packet frame, the wireless radio system may disable the transmitter, then reenable either a receiver or transmitter, which may initiate a receiving or transmission ramp up period. These processes may occur at the wireless communication dongle or information handling system and at the wireless IO device in existing systems. These RX ramp up periods and TX ramp up periods in existing systems may have a duration of up to 40 microseconds in some cases. As such, a data packet communication frame in which a wireless IO device is instructed to transmit four wireless IO device data packets in a row, for example, may include at least 160 microseconds of ramping periods. In many cases, the wireless IO device is also programmed to delay the ramp up period (e.g., with a disable delay timer (Td)) following a detected end of transmission or end of receipt of a data packet in order to ensure proper spacing between data packet transmission/reception within a data packet communication frame. This added delay (Td) may further decrease the number of data packets that may be transmitted per second, which is a critical metric for many customers when deciding which wireless IO devices to purchase. Further, in order to ensure that the wireless communication dongle or information handling system is capable of receiving (e.g., receiver enabled and ramped up) at the time of transmission from the wireless IO device of a given data packet, existing systems may add extra delays between data packets. These added delays may ensure that the wireless communication dongle has the needed time to disable the receiver, reenable the receiver, and ramp up as needed in between transmission of wireless IO device data packets.

In an embodiment, the controller at the wireless communications dongle 430 or information handling system 400 executing code instructions of the wireless IO device and dongle synchronized RX/TX switching system may avoid unnecessary RX ramping at the wireless communication dongle 430 or information handling system 400. For example, the controller at the wireless communications dongle 430 or information handling system 400 executing code instructions of the wireless IO device and dongle synchronized RX/TX switching system may trigger an end transmission event at 488, immediately upon a detected end of receipt of the wireless IO device data packet 421 at the wireless communication dongle 430 or information handling system 400. The end transmission event may further trigger a scheduled, registered, programmed, or subscribed interrupt call back routine at 488 which may override a command to disable the receiver at the wireless communication dongle 430 or information handling system 400. This may avoid initiation of an RX ramp up. As such, the wireless communication dongle 430 or information handling system 400 may be immediately capable of receiving a next data packet (e.g., 422) during a period of time in between receipt of the first wireless IO device data packet 421 and transmission of the second wireless IO device data packet 422, in which the wireless IO device 480 is undergoing a mandatory TX ramp up process 491. Skipping the RX ramp up process at the wireless communication dongle 430 or information handling system 400 while the wireless IO device 480 is undergoing a TX ramp up process at 491 of roughly 40 microseconds or more may ensure that the wireless communication dongle 430 or information handling system 400 is ready to receive at 488, at least 40 microseconds (or the duration of the TX ramp up process 491 at the wireless IO device) before the second wireless IO device data packet 422 is transmitted. In fact, this omission of the RX ramp up process at the wireless communication dongle 430 or information handling system 400 may afford the wireless communication dongle 430 or information handling system 400 enough time in an embodiment to read a payload of the wireless IO device data packet 421 into memory from the data buffer in between receipt of the first wireless IO device data packet 421 and the second wireless IO device data packet 422.

A microcontroller at the wireless IO device 480 executing code instructions of the wireless IO device and dongle synchronized RX/TX switching agent in an embodiment may also decrease unnecessary delay between consecutive transmission or receipt of multiple wireless IO device data packets (e.g., 421, 422, 423) within an orchestrated data packet communication frame 420. As described herein, in existing systems, the wireless communication dongle or information handling system may undergo the TX ramp up that the current disclosure omits in between each wireless IO device data packet transmission. Those existing systems may add extra delays at the wireless IO device between transmissions of data packets, in order to ensure that the wireless communication dongle or information handling system is capable of receiving (e.g., receiver enabled and ramped up) at the time of transmission from the wireless IO device of a given data packet. Because the wireless communication dongle 430 or information handling system 400 in an embodiment of the present disclosure do not allow the receiver to enter a disabled state or to perform an RX ramp up in between such data packets (e.g., 421 and 422), as described directly above, these added or extra delays in between transmissions from the wireless IO device 480 or no longer necessary.

The microcontroller of the wireless IO device 480 in an embodiment may execute code instructions of the wireless IO device and dongle synchronized RX/TX switching agent to avoid such unnecessary delays at the wireless IO device 480 in between such consecutive transmissions or receipts of those multiple wireless IO device data packets (e.g., 421, 422, 423) by omitting a programmed delay (Td) between a detected end of transmission of a data packet and disabling of the transmitter at the wireless IO device. In an embodiment, the microcontroller of the wireless IO device 480 may execute code instructions of the wireless IO device and dongle synchronized RX/TX switching agent to trigger a radio disable event at 488, which may invoke an asynchronous radio interrupt callback routine to disable the transmitter for the wireless IO device 480. The microcontroller of the wireless IO device 480 may also execute code instructions of the wireless IO device and dongle synchronized RX/TX switching agent to enable a timer interrupt routine that starts running of the TX radio interrupt callback timer at 488. Upon disabling of the transmitter by the wireless IO device 480 at 488 in an embodiment, the transmitter may be reenabled almost immediately thereafter (e.g., about one microsecond later than 488 in some embodiments), which may trigger initiation of a TX ramp up period 491 of about 40 microseconds. At this point, the wireless radio system for the wireless IO device 480 in an embodiment may load the payload for the wireless IO device second data packet 422 into the radio buffer. As described herein, execution of this TX ramp up period 491 at the wireless IO device 480 in between transmission of each of the wireless IO device data packets (e.g., 421 and 422) within a data packet communication frame 420 may give the wireless communication dongle 430 or information handling system 400 time to read data from the buffer and be ready to receive before the wireless IO device 480 has completed its mandatory TX ramp up period 491. Thus, no delay between detected end of transmission at 488 of a data packet 421 at the wireless IO device 480 and triggering of a radio disable event at 488 is needed in order to synchronize transmission and receipt of data packets (e.g., 421, 422, 423) between the wireless IO device 480 and the communications dongle 430 or information handling system 400. At 489, the wireless IO device 480 may be ready to transmit the second wireless IO device data packet 422.

As described herein, the controller for a wireless radio system of a wireless communication dongle 430 or information handling system 400 in embodiments may orchestrate scheduled delivery of a plurality of data packets (e.g., 421, 422, 423) from each of one or more wireless IO devices (e.g., 480) in a data packet communication frame 420 by instructing the wireless IO device 480 to transmit a selected number of data packets (e.g., N) in allotted timeslots. In order to ensure that each wireless IO device data packet (e.g., 421, 422, 423) is transmitted within its allotted timeslot of a given data packet communication frame 420 in an embodiment, the microcontroller of a wireless IO device 480 may execute code instructions of a wireless IO device and dongle synchronized RX/TX switching agent to ensure the TX ramp up process 491 is completed in such a way that allows for transmission of the next data packet 422 within its allotted time slot. The wireless radio system of the wireless IO device 480 in an embodiment may immediately transmit the second packet 422 upon the end of the TX ramp up period 491. The duration of time that elapses between the detected end of transmission at 488 of the first packet 421 and the beginning of the allotted time slot for the second packet 422 may depend upon the length of the first packet 421 and may not be precisely known by the wireless IO device 480, the wireless communication dongle 430 or the information handling system 400 prior to such transmission of the first packet 421. As such, the wireless IO device 480 in an embodiment needs to have a method of determining this duration of time (e.g., in between 488 and 489) after the detected end of transmission at 488 of the first data packet 421, and performing an on-the-fly adjustment to the timing of the TX ramp up period 491 at the wireless IO device 480 in order to ensure the TX ramp up period 491 does not end until the allotted time slot for the second packet 422 has begun at 489.

The microcontroller of the wireless IO device 480 in an embodiment may address these issues by executing code instructions of a wireless IO device and dongle synchronized RX/TX switching agent to set a radio interrupt callback timer that may delay the TX ramp up process 491 execution in between transmission of data packets (e.g., 421 and 422). Upon running of the radio interrupt callback timer in an embodiment, the microcontroller of the wireless IO device 480 may execute code instructions of the wireless IO device and dongle synchronized RX/TX switching agent to reenable the transmitter, which may initiate the TX ramp up period 491. This may ensure that the TX ramp up process 491 does not conclude until the allotted time slot for the next data packet (e.g., 422) occurs. The adjustable radio interrupt callback timer in embodiments described herein may be set or programmed to have a duration of any value greater than one microsecond. The radio interrupt callback timer in an embodiment may begin to run at 488, immediately upon determination of the end of transmission of the first data packet 421, and may delay the beginning of the TX ramp up 491 such that it does not end until the allotted time slot for the second data packet 422 begins at 489. The TX ramp up period 491 in an embodiment may begin as late as the beginning of the allotted time slot at 489 for the second data packet 422, such that at least a portion of the TX ramp up period 491 occurs after 489, within the allotted time slot for the transmission of the second packet 422.

The wireless IO device and dongle synchronized RX/TX switching system and agent in an embodiment may also allow the wireless radio systems of the wireless communication dongle 430, information handling system 400, or wireless IO device 480 the necessary time to power up receivers or transmitters upon switching RX/TX modes, such as for polling packets or at the beginning or end of the data packet communication frame 420. For example, as described in greater detail above with respect to FIG. 3, the initial polling packet in embodiments described herein may also include a communication frame transmission timer duration 490 that triggers switching of the wireless radio system RX/TX modes upon its expiration. This communication frame transmission timer 490 may have a higher priority than the radio interrupt callback timer 491 described directly above, such that expiration of the communication frame transmission timer duration 490 triggers the wireless radio system of the wireless communication dongle 430, information handling system 400, or wireless IO device 480 to switch RX/TX modes even if the radio interrupt callback timer 491 is running, upon expiration of the communication frame transmission timer duration 490. This essentially initiates the RX/TX mode switch before the controller at the wireless communication dongle 430 or information handling system 400 or the microcontroller at the wireless IO device 480 can reenable transmission or reception at those devices.

For example, a detected end of transmission at time 404 for the polling packet at 403 by the wireless radio system of the wireless communication dongle 430 or information handling system 400 may start a communication frame transmission timer 490 at the wireless communication dongle 430 or information handling system 400. As another example, a detected end of receipt at time 404 for the polling packet 403 by the wireless radio system of the wireless IO device 480 may start the communication frame transmission timer duration 490 at the wireless IO device 480. The duration of the communication frame transmission timer 490 may be identified within the initial polling packet 403, as described above in greater detail with respect to FIG. 3. The communication frame transmission timer duration 490 in an embodiment may be set to terminate at a detected end of transmission or reception at time 481 of the last selected number of wireless IO data packets (e.g., 423), as defined within the initial polling packet 403. For example, the duration for the communication frame transmission timer 490 may be set at the wireless communication dongle 430 or information handling system 400 to the period of time between the detected end of transmission at time 404 for the initial polling packet 403 and the end 481 of receipt of the last data packet 423 within the data packet communication frame 420. As another example, the duration 490 for the communication frame transmission timer in an embodiment is also set the wireless IO device 480 to the period of time the detected end of reception at 404 for the initial polling packet 403 and the end of transmission at 481 of the last data packet 423 in the data packet communication frame 420.

The end of the data packet communication frame 420 may trigger the start of another tandem radio interrupt callback timer at the wireless IO device 480. As described herein, expiration at time 481 of the communication frame transmission timer duration 490 at the wireless communication dongle 430, information handling system 400, or wireless IO device 480 in an embodiment may have a higher priority than the radio interrupt callback timer described directly above. This may ensure that expiration of the communication frame transmission timer duration 490 triggers the wireless radio system of the wireless communication dongle 430, information handling system 400, or wireless IO device 480 to switch RX/TX modes even if the radio interrupt callback timer is running, and upon expiration of the communication frame transmission timer duration 490 at the communication frame 420 end time at 481.

Thus, expiration of the communication frame transmission timer duration 490 in an embodiment may trigger a switching command to be issued by the microcontroller of the wireless IO device 480 executing code instructions of the wireless IO device and dongle synchronized RX/TX switching agent and by the controller of the wireless communication dongle 430 or information handling system 400 executing code instructions of the wireless IO device and dongle synchronized RX/TX switching system. For example, upon expiration of the communication frame transmission timer duration 490 at time 481, the microcontroller of the wireless IO device 480 executing code instructions of the wireless IO device and dongle synchronized RX/TX switching agent may issue a command to switch the wireless IO device radio system from a TX mode to an RX mode. This command may cause the wireless IO device radio system to disable transmission, enable receipt, and begin an RX ramp up process at 484. As another example, upon expiration of the communication frame transmission timer duration 490 at time 481, the controller of the wireless communication dongle 430 or information handling system 400 executing code instructions of the wireless IO device and dongle synchronized RX/TX switching system may issue a command to switch the wireless dongle radio system from an RX mode to a TX mode. This command may cause the wireless dongle radio system to disable receiving, enable transmission, and begin a TX ramp up process at 401. At 402, the wireless IO device 480 may be prepared to receive and the wireless communication dongle 430 or information handling system 400 in an embodiment may be prepared to transmit the updated polling packet 407.

This commands switching of the wireless radio system of the wireless IO device 480 to a RX mode for reception of an updated polling packet 407 before the microcontroller at the wireless IO device 480 can reenable transmission of further data packets. Similarly, expiration of the communication frame transmission timer duration 490 at time 481 triggers switching of the wireless radio system of the wireless communication dongle 430 or information handling system 400 to a TX mode for transmission of an updated polling packet 407 before the controller at the wireless communication dongle 430 or information handling system 400 can reenable reception of further data packets from the wireless IO device 480. In such a way, the wireless IO device and dongle synchronized RX/TX switching system in embodiments herein may ensure that, following completion of each data packet communication frame (e.g., 420) at 481, the wireless communication dongle 430 or information handling system 400 switches from an RX mode to a TX mode to transmit an updated polling packet 407 for the next data packet communication frame. The wireless IO device and dongle synchronized RX/TX switching agent in embodiments herein may also ensure that, following completion of each data packet communication frame (e.g., 420) at 481, the wireless IO device 480 switches from a TX mode to an RX mode to receive such an updated polling packet 407 for the next data packet communication frame.

The controller for the wireless communication dongle 430 or information handling system 400 in an embodiment may execute code instructions of the IO device wireless communication polling and packet frame system to generate and transmit an updated polling packet 407. In an embodiment, such an updated polling packet 407 may include an acknowledgement header (ACK) identifying the number (N) of packets received during the data packet communication frame 420. The updated polling packet 407 in an embodiment may further include updated instructions for synchronizing transmission of data packets within a second, later data packet communication frame. For example, the updated polling packet 407 may, at the very least, provide an updated time for initiation of such a second, later data packet communication frame. In such an embodiment, the updated polling packet 407 may or may not further adjust one or more of the selected wireless IO device data packet number, selected wireless IO device data packet length, or wireless IO device allotted data packet transmission time slots for the wireless IO device 480. For example, in an embodiment, the updated polling packet 407 identifying an updated time for initiation of a second, later data packet communication frame may also provide an updated selected wireless IO device number equivalent to the initial selected wireless IO device data packet number. In another example, in an embodiment, the updated polling packet 407 may also provide an updated selected wireless IO device data packet length equivalent to the initial selected wireless IO device data packet length. In still another example, in an embodiment, the updated polling packet 407 may also provide updated wireless IO device allotted data packet time slots having the same positions within the second data packet communication frame as the positions of the initial wireless IO device allotted data packet transmission time slots within the first data packet communication frame 420.

Transmission of an initial polling packet prior to a scheduled data packet communication frame 420 and transmission of an updated polling packet 407 following the scheduled data packet communication frame 420 for orchestrating an upcoming second data packet communication frame may minimize the number of acknowledgement packets transmitted from the wireless communication dongle 430 or information handling system 400 and minimize the frequency with which switches between TX mode and RX mode are required. In such a way, the IO device wireless communication polling and packet frame system may decrease the frequency of ACK data packets transmitted, and the frequency of mode-switching described above with respect to existing systems. This may decrease power consumed by rapid mode-switching, reduce latency and improve overall user experience and wireless IO device (e.g., 480) performance.

Figure 5:
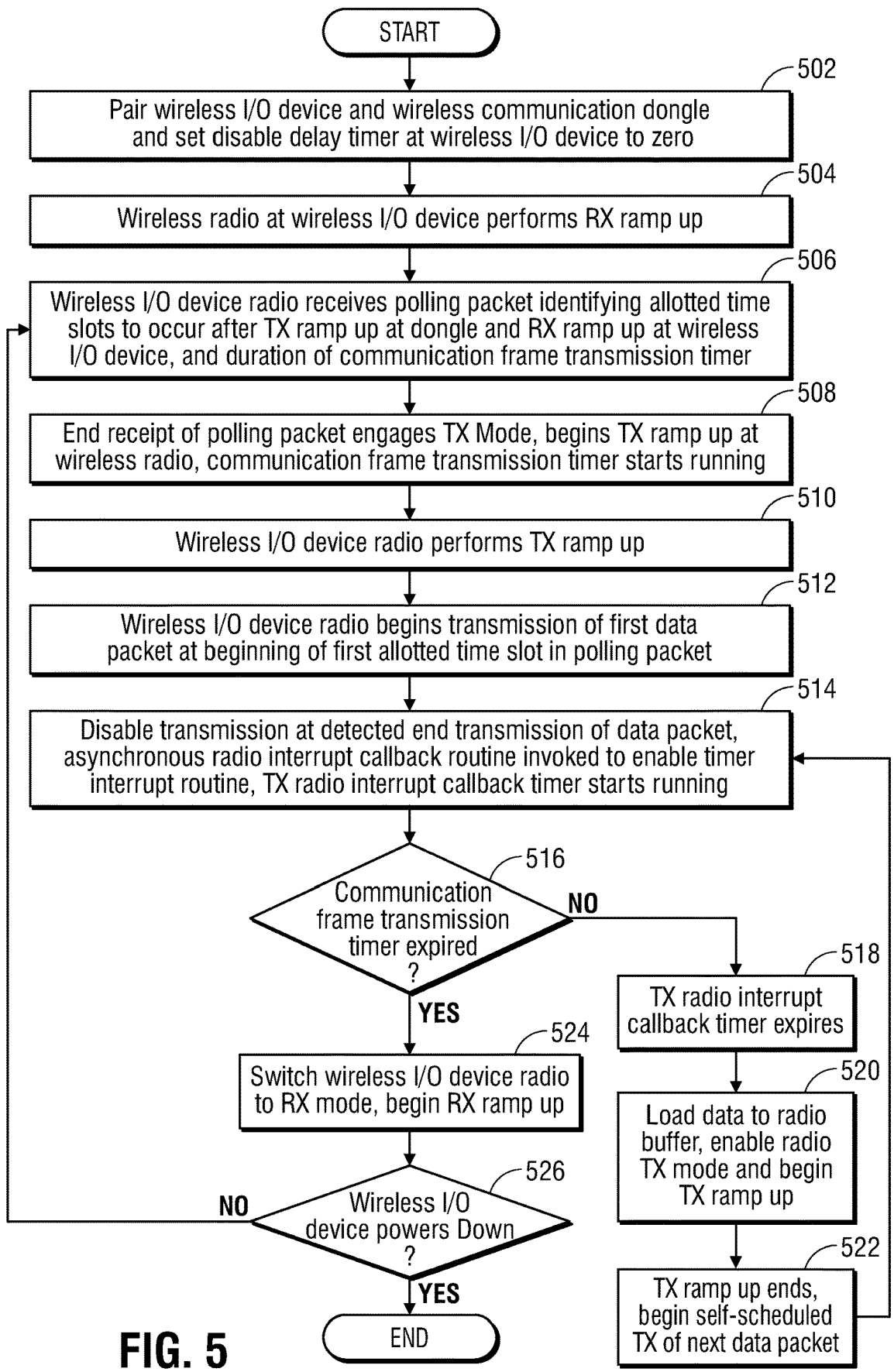
FIG. 5 is a flow diagram illustrating a method of synchronizing switching between RX and TX modes at a wireless IO device with radio mode switching at a wireless communication dongle to allow for orchestrated transmission of data packet communication frames according to an embodiment of the present disclosure.

FIG. 5 is a flow diagram illustrating a method of synchronizing switching between receive (RX) and transmit (TX) modes at a wireless input/output (IO) device with radio mode switching at a wireless communication dongle to allow for orchestrated transmission of data packet communication frames while ensuring rapid switching from transmit (TX) to receive (RX) modes following communications frames according to an embodiment of the present disclosure. As described herein, the controller for a wireless radio system of a wireless communication dongle or information handling system in an embodiment may orchestrate scheduled delivery of a plurality of data packets from each of one or more wireless IO devices in a data packet communication frame by instructing the wireless IO device to transmit a selected number of data packets in allotted timeslots. In order to ensure that each wireless IO device data packet is transmitted within its allotted timeslot of a given data packet communication frame in an embodiment, the microcontroller of a wireless IO device may execute code instructions of a wireless IO device and dongle synchronized RX/TX switching agent to ensure that a TX ramp up process is completed at the wireless IO device in such a way that allows for transmission of the next data packet within its allotted time slot. The microcontroller of a wireless IO device may execute code instructions of a wireless IO device and dongle synchronized RX/TX switching agent in an embodiment to delay the TX ramp up process execution at the wireless IO device in between transmission of data packets to ensure that the TX ramp up process does not conclude until the allotted time slot for the next data packet occurs. Th At block 502, the wireless IO device in an embodiment may pair with the wireless communication dongle or information handling system. For example, as described in an embodiment at FIG. 3, at 311 in an embodiment, the wireless communication dongle 330 or information handling system 300 may transmit and receive information necessary to pair the wireless IO device 380 with the wireless communication dongle 330 or information handling system 300. This may include, for example, pairing or wireless communication profiles for pairing the wireless communication dongle 330 or information handling system 300 and the wireless IO device 380. Such pairing or wireless communication profiles may operate to identify the wireless IO device 380 as a device authorized to transceive data with the wireless communication dongle 330 or information handling system 300 under the paired wireless protocol, as well as information sufficient to identify the wireless IO device 380, such as a Media Access Control (MAC) address, IP address, or model number. Such pairing or wireless communication profiles in an embodiment may also include a set or programmed duration of one or more ramp up processes for the wireless IO device 380, such as a TX ramp up duration for powering up a transmitter upon switching to a TX mode or an RX ramp up duration for powering up a receive upon switching to an RX mode.

The pairing process may also include the wireless communication dongle instructing modification of a pre-programmed disable delay timer at the wireless IO device in an embodiment. For example, as described herein, in some existing systems, the wireless IO device 380 may have a pre-programmed disable delay timer (Td) that can be adjusted or modified, and may delay disabling of the receiver at 385 after a detected end of transmission or reception (e.g., at 304) of a data packet. In some embodiments, the controller for the wireless communication dongle 330 or information handling system 300 executing code instructions for the wireless IO device and dongle synchronized RX/TX switching system may work in tandem with the microcontroller of the wireless IO device 380 executing code instructions of the wireless IO device and dongle synchronized RX/TX switching agent to set the duration of the disable delay timer (Td) to a value of zero during a pairing process occurring at 311. In this way, additional delay by virtue of the disable delay timer (Td) within the data packet communication frame may be avoided between consecutively transmitted wireless IO device data packets by the wireless IO device.

The wireless radio at the wireless IO device in an embodiment at block 504 may perform a RX ramp up process. For example, in an embodiment, the wireless IO device 380 may be placed in a receive (RX) mode at 379 for receipt of an initial polling packet 303 transmitted from the wireless communications dongle 330 or the information handling system 300. As described herein, when the wireless radio system for the wireless IO device 380 switches between RX and TX mode, or upon initial power up, the wireless IO device radio system may undergo a ramp up process (e.g., 382) in which the receiver or transmitter powers up to a state in which it is ready to receive or transmit data (e.g., at least 90% of power capacity). Upon completion of the RX ramp up process 382, the wireless IO device 380 may be ready to receive at 383.

At block 506, the wireless IO device radio in an embodiment may receive a polling packet from a wireless communication dongle identifying allotted time slots to occur after a TX ramp up period at the wireless communication dongle and the RX ramp up process at the wireless IO device. For example, in an embodiment described with respect to FIG. 3 at 302, the wireless radio system for the wireless communications dongle 330 or information handling system 300 may begin transmission of the initial polling packet 303 to the wireless IO device 380. The initial polling packet 303 in an embodiment may set the first allotted time slot within an upcoming data packet communication frame 320 to begin at 387. Time 387 reflects a period of time after the detected end of transmission of the initial polling packet 303 that is greater than the duration 305 of the RX ramp up process for the wireless communication dongle 330 or information handling system 300 and at or greater than the duration 386 of the TX ramp up process for the wireless IO device 380

(which may be known to the wireless communication dongle 330 or information handling system 300 following pairing of the two devices at block 502).

In some embodiments, the duration 305 of the RX ramp up process for the wireless communication dongle 330 or information handling system 300 may be set or programmed to be less than the duration 386 of the TX ramp up process for the wireless IO device 380 in order to ensure that the wireless communication dongle 330 or information handling system 300 completes the RX ramp up process and is ready to receive at time 306 prior to completion at time 387 of the TX ramp up process 386 at the wireless IO device 380. This may occur even when both ramp up processes are triggered by the same event, such as the detected end of receipt or transmission 304 of the initial polling packet 303 in an embodiment.

A communication frame transmission timer may start running at block 508 in an embodiment. For example, in an embodiment described with respect to FIG. 4, a detected end of transmission at time 404 for the polling packet at 403 by the wireless radio system of the wireless communication dongle 430 or information handling system 400 may start a communication frame transmission timer 490 at the wireless communication dongle 430 or information handling system 400. As another example, a detected end of receipt at time 404 for the polling packet 403 by the wireless radio system of the wireless IO device 480 may start the communication frame transmission timer 490 at the wireless IO device 480. The duration of the communication frame transmission timer 490 may be identified within the initial polling packet 403, and may be set to terminate at a detected end of transmission or reception at time 481 of the last wireless IO data packet of the selected number of wireless IO data packets (e.g., 423), as defined within the initial polling packet 403.

The wireless radio system of the wireless IO device in an embodiment at block 508 may detect an end of receipt of the polling packet from the wireless communication dongle and begin a TX ramp up process. The microcontroller for the wireless IO device may also execute code instructions of the wireless IO device and dongle synchronized RX/TX switching agent at block 508 to determine the duration of a TX radio interrupt callback timer from the polling packet information. The communication frame transmission timer may also begin to run in an embodiment at block 508. For example, in an embodiment described with respect to FIG. 3, the wireless IO device radio system for the wireless IO device 380 may detect the end of receipt of the initial polling packet 303 at time 302, prompting the microcontroller executing code instructions of the wireless IO device and dongle synchronized RX/TX switching agent to instruct the wireless radio agent of the wireless IO device 380 to switch from the RX mode to the TX mode for transmission of wireless IO device data packets within the data packet communication frame 320. The end of receipt of the polling packet 303 at time 304 may also trigger the communication frame transmission timer 390 at the wireless IO device 380.

At block 510, the wireless IO device radio may perform a TX ramp up process in an embodiment. For example, the wireless IO device 380 radio may perform a TX ramp up process during a period 386. This may ensure that the wireless IO device 380 is prepared to transmit the first data packet 321 at time 387, at the scheduled beginning of the data packet communication frame 320, as identified within the initial polling packet 303.

The wireless IO device radio in an embodiment may begin transmission of a first data packet within a data packet communication frame at block 512, at the beginning of a first allotted time slot identified in the received polling packet. For example, at the time specified within the initial polling packet 303 in an embodiment, the data packet communication frame 320 may begin with receipt of a first wireless IO device data packet 321 responsive to the initial polling packet 303 from the wireless IO device 380 at data packet communication frame start time 387. In an embodiment, the first packet 321 for the data packet communication frame 320 may adhere to the instructions received within the initial polling packet 303. For example, in an embodiment, the first packet 321 may have a length equivalent to the wireless IO device data packet length of defined in the initial polling packet 303 and may be delivered at the synchronized time (e.g., 387). Data packet communication frame start time 387 designates the beginning of the data packet communication frame 320 within the first of N wireless IO device allotted data packet transmission time slots, as defined within the initial polling packet 303, but may not be as long as the communication frame timer duration 390 which may include the TX ramp up 386 and start at the detected polling packet transmission end 304.

At block 514, the microcontroller for the wireless IO device may execute code instructions of the wireless IO device and dongle synchronized RX/TX switching agent to disable transmission upon a detected end of transmission of a wireless IO device data packet. This may also start running of the TX radio interrupt callback timer in an embodiment. For example, in an embodiment described with reference to FIG. 4, the microcontroller for the wireless IO device 480 may execute code instructions of the wireless IO device and dongle synchronized RX/TX switching agent at time 488 to trigger a radio disable event at a detected end of transmission of the first data packet 421 within data packet communication frame 420. As described herein, when the wireless IO device 480 detects that it has completed transmission of a data packet (e.g., 421) at time 488 and disable delay timer (Td) is set to zero, the wireless radio system may invoke an asynchronous radio interrupt callback routine to disable the transmitter for the wireless IO device 480 and to enable a timer interrupt routine that starts running of the TX radio interrupt callback timer.

The microcontroller executing code instructions of the wireless IO device and dongle synchronized RX/TX switching agent in an embodiment at block 516 may determine whether a communication frame transmission timer has run or expired. As described herein, the wireless IO device and dongle synchronized RX/TX switching system and agent in an embodiment may allow the wireless radio systems of the wireless communication dongle 430, information handling system 400, or wireless IO device 480 the necessary time to power up receivers or transmitters upon actual switching RX/TX modes, such as for polling packets or at the beginning or end of the data packet communication frame 420. For example, the initial polling packet in embodiments described herein may also include a communication frame transmission timer 490 that triggers switching of the wireless radio system RX/TX modes upon its expiration. This communication frame transmission timer 490 may have a higher priority than the radio interrupt callback timer discussed above at block 514, such that expiration of the communication frame transmission timer 490 triggers the wireless radio system of the wireless communication dongle 430, information handling system 400, or wireless IO device 480 to switch RX/TX modes even if the radio interrupt callback timer is running, upon expiration of the communication frame transmission timer 490. This essentially initiates the RX/TX mode switch before the controller at the wireless communication dongle 430 or information handling system 400 or the microcontroller at the wireless IO device 480 can reenable transmission or reception at those devices.

The communication frame transmission timer 490 in an embodiment may be set to terminate at a detected end of transmission or reception at 481 of the last wireless IO data packet (e.g., 423) of the selected number of wireless IO data packets in the data packet communication frame 420, as defined within the initial polling packet 403. For example, the duration for the communication frame transmission timer 490 may be set at the wireless communication dongle 430 or information handling system 400 to the period of time between the detected end of transmission at time 404 for the initial polling packet 403 and the end of receipt of the last data packet 423 at time 481 within the data packet communication frame 420. As another example, the duration 490 for the communication frame transmission timer in an embodiment is also set the wireless IO device 480 to the period of time the detected end of reception at time 404 for the initial polling packet 403 and the end of transmission at time 481 of the last data packet 423 in the data packet communication frame 420.

The end of the data packet communication frame 420 may trigger the start of another radio interrupt callback timer at the wireless IO device 480. As described herein, expiration at 481 of the communication frame transmission timer 490 at the wireless communication dongle 430, information handling system 400, or wireless IO device 480 in an embodiment may have a higher priority than the radio interrupt callback timer described directly above. This may ensure that expiration of the communication frame transmission timer 490 triggers the wireless radio system of the wireless communication dongle 430, information handling system 400, or wireless IO device 480 to switch RX/TX modes even if the radio interrupt callback timer is running, and upon expiration of the communication frame transmission timer 490 at the communication frame 420 end time at 481.

If the communication frame transmission timer has expired, this may indicate that all of the allotted time slots for transmission of data packets within the current data packet communication frame have passed, and the wireless IO device needs to switch from TX to RX mode to receive an updated polling packet providing instructions for the next data packet communication frame. The method may then proceed to block 524. If the communication frame transmission timer has not yet expired, this may indicate that there are remaining time slots for further transmission of data packets within the current data packet communication frame, and the wireless IO device may need to remain in a TX mode to perform such transmissions. The method may then proceed to block 518 for reenabling of the transmitter for such later transmission of remaining wireless IO device data packets among the selected number of wireless IO device data packets in the data packet communication frame.

At block 518, in an embodiment in which the communication frame transmission timer has not yet expired, the microcontroller for the wireless IO device may determine that the TX radio interrupt callback timer has expired. For example, the radio interrupt callback timer may expire at time 489. As described herein, in order to ensure that each wireless IO device data packet (e.g., 421, 422, 423) is transmitted within its allotted timeslot of a given data packet communication frame 420 in an embodiment, the microcontroller of a wireless IO device 480 may execute code instructions of a wireless IO device and dongle synchronized RX/TX switching agent to ensure the TX ramp up process 491 is completed in such a way that allows for transmission of the next data packet 422 within its allotted time slot. The wireless radio system of the wireless IO device 480 in an embodiment may immediately transmit the second packet 422 upon the end of the TX ramp up period 491. The duration of time that elapses between the detected end of transmission at 488 of the first packet 421 and the beginning of the allotted time slot for the second packet 422 may depend upon the length of the first packet 421 and may not be precisely known by the wireless IO device 480, the wireless communication dongle 430 or the information handling system 400 prior to such transmission of the first packet 421.

The microcontroller of the wireless IO device 480 in an embodiment may execute code instructions of a wireless IO device and dongle synchronized RX/TX switching agent to determine the duration of this time (e.g., in between 488 and 489), and perform an on-the-fly adjustment to the timing of the TX ramp up period 491 at the wireless IO device 480 in order to ensure the TX ramp up period 491 does not end until the allotted time slot for the second packet 422 has begun at 489. In an embodiment, the microcontroller of the wireless IO device 480 may execute code instructions of a wireless IO device and dongle synchronized RX/TX switching agent may set a radio interrupt callback timer that may delay the TX ramp up process 491 execution in between transmission of data packets (e.g., 421 and 422).

Upon running of the radio interrupt callback timer in an embodiment, the microcontroller of the wireless IO device 480 may execute code instructions of the wireless IO device and dongle synchronized RX/TX switching agent to reenable the transmitter, which may initiate the TX ramp up period 491. This may ensure that the TX ramp up process 491 does not conclude until the allotted time slot for the next data packet (e.g., 422) occurs. The adjustable radio interrupt callback timer in embodiments described herein may be set or programmed to have a duration of any value greater than one microsecond. The radio interrupt callback timer in an embodiment may begin to run at 488, immediately upon determination of the end of transmission of the first data packet 421, and may delay the beginning of the TX ramp up 491 such that it does not end until the allotted time slot for the second data packet 422 begins at 489.

The microcontroller of the wireless IO device in an embodiment at block 520 may execute code instructions of a wireless IO device and dongle synchronized RX/TX switching agent to reenable transmission and begin a TX ramp up process. Upon running of the radio interrupt callback timer in an embodiment, the microcontroller of the wireless IO device 480 may execute code instructions of the wireless IO device and dongle synchronized RX/TX switching agent to reenable the transmitter, which may initiate the TX ramp up period 491. This may ensure that the TX ramp up process 491 does not conclude until the allotted time slot for the next data packet (e.g., 422) occurs. At this point, the wireless radio system for the wireless IO device 480 in an embodiment may load the payload for the wireless IO device second data packet 422 into the radio buffer. The adjustable radio interrupt callback timer in embodiments described herein may be set or programmed to have a duration of any value greater than one microsecond. The radio interrupt callback timer in an embodiment may begin to run at 488, immediately upon determination of the end of transmission of the first data packet 421, and may delay the beginning of the TX ramp up 491 such that it does not end until the allotted time slot for the second data packet 422 begins at 489.

The microcontroller of the wireless IO device in an embodiment at block 522 may execute code instructions of a wireless IO device and dongle synchronized RX/TX switching agent to begin self-scheduled transmission of a next data packet upon ending of the TX ramp up process. As described herein, the wireless radio system of the wireless IO device 480 in an embodiment may immediately transmit the second packet 422 upon the end of the TX ramp up period 491, in order to fit within the allotted time slots given within the initial polling packet. This may occur, for example, at or after 489 in an embodiment. The method may then return to block 514 for disabling the transmitter for a brief period in between multiple data packets transmitted within the same data packet communication frame.

At block 524, in an embodiment in which the communication frame transmission timer has expired, the microcontroller of the wireless IO device may execute code instructions of the wireless IO device and dongle synchronized RX/TX switching agent to switch the wireless IO device radio to a RX mode and begin a RX ramp up process. For example, expiration of the communication frame transmission timer 490 in an embodiment may trigger a switching command to be issued by the microcontroller of the wireless IO device 480 executing code instructions of the wireless IO device and dongle synchronized RX/TX switching agent. More specifically, upon expiration of the communication frame transmission timer 490 at time 481, the microcontroller of the wireless IO device 480 executing code instructions of the wireless IO device and dongle synchronized RX/TX switching agent may issue a command to switch the wireless IO device radio system from a TX mode to an RX mode. This command may cause the wireless IO device radio system to disable transmission and begin an RX ramp up process at time 484. At 402, the wireless IO device 480 may be prepared to receive, and the wireless communication dongle 430 or information handling system 400 in an embodiment may be prepared to transmit, the updated polling packet 407.

The command to switch the wireless radio system of the wireless IO device 480 to a RX mode for reception of an updated polling packet 407 occurs before the microcontroller at the wireless IO device 480 can reenable transmission of further data packets. In such a way, the wireless IO device and dongle synchronized RX/TX switching agent in embodiments herein may ensure that, following completion of each data packet communication frame (e.g., 420) at 481, the wireless IO device 480 switches from a TX mode to an RX mode to receive such an updated polling packet 407 for the next data packet communication frame.

The microcontroller of the wireless IO device in an embodiment at block 526 may determine whether the wireless IO device has powered down. If the wireless IO device has not powered down in an embodiment, the method may proceed to block 506 for receipt of an updated polling packet from the wireless communication dongle instructing transmission of more wireless IO data packets during a second wireless communication data frame. For example, the controller for the wireless communication dongle 430 or information handling system 400 in an embodiment may execute code instructions of the IO device wireless communication polling and packet frame system to generate and transmit an updated polling packet 407. By repeating the loop between blocks 506 and 526, the wireless IO device may decrease ramp up period delays between transmissions of multiple data packets within a communication frame at a wireless IO device while ensuring rapid switching from TX to RX modes following communications frames. If the wireless IO device has powered down in an embodiment, there may be no need or no capability to receive further polling packets from the wireless communication dongle, and the method may then end.

Figure 6:
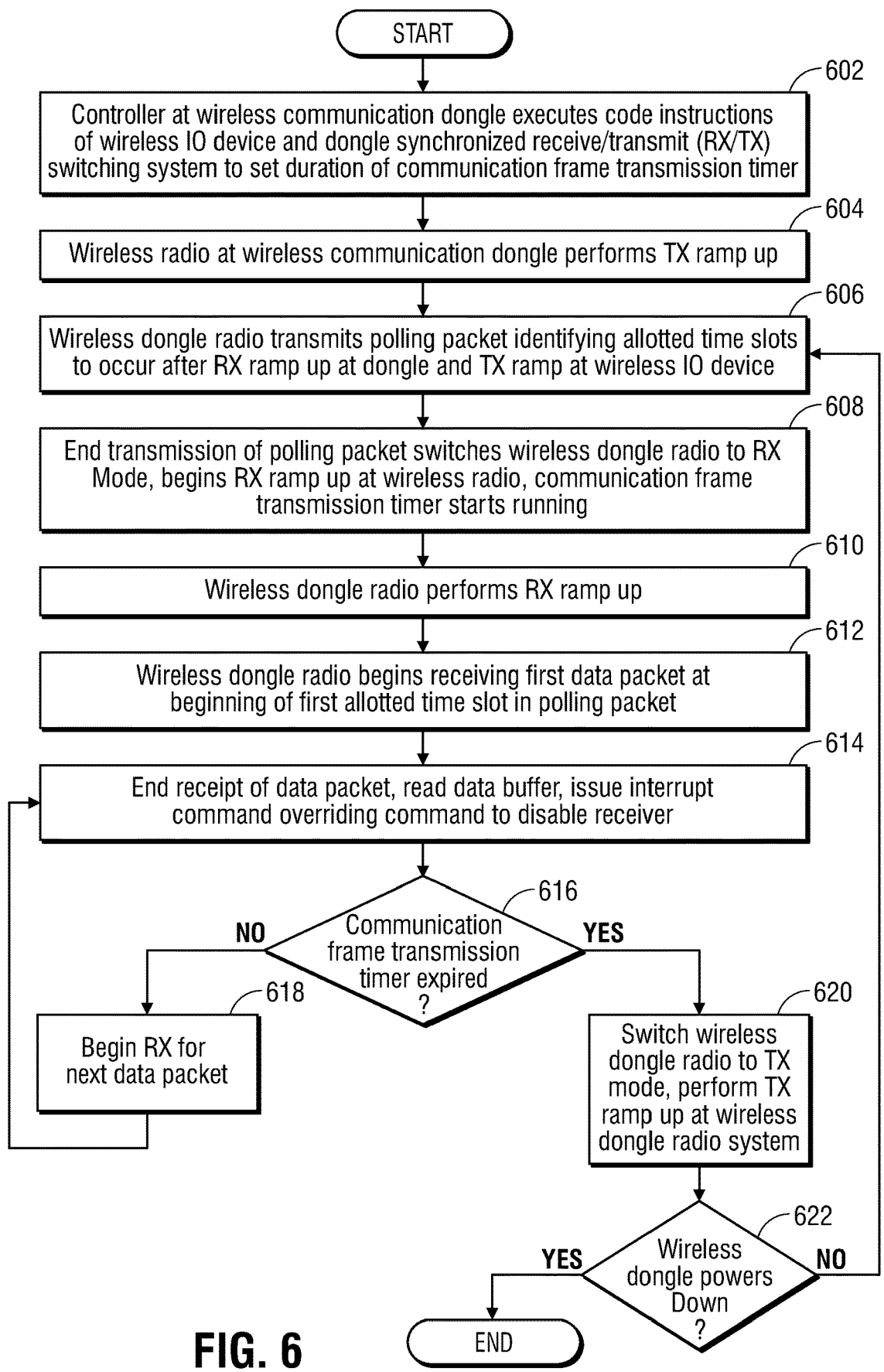
FIG. 6 is a flow diagram illustrating a method of decreasing ramp up period delays within reception of a data packet communication frame at a wireless communication dongle while ensuring rapid switching from RX to TX modes following data packet communications frames according to an embodiment of the present disclosure.

FIG. 6 is a flow diagram illustrating a method of decreasing ramp up period delays between receptions of multiple data packets within a communication frame at a wireless communication dongle while ensuring rapid switching from receive (RX) to transmit (TX) modes following communications frames according to an embodiment of the present disclosure. As described herein, the controller at the wireless communications dongle executing code instructions of the wireless IO device and dongle synchronized RX/TX switching system may ensure that the wireless communications dongle or information handling system is always ready to receive wireless IO device data packets prior to transmission of such data packets from the wireless IO device. In an embodiment, the controller at the wireless communications dongle executing code instructions of the wireless IO device and dongle synchronized RX/TX switching system may trigger an end transmission event immediately upon a detected end of receipt of each wireless IO device data packet at the wireless communication dongle or information handling system, which may further trigger a registered, programmed, subscribed, or scheduled interrupt callback routine that overrides a command to disable the receiver. By interrupting the disable command in such a way, the controller at the wireless communications dongle executing code instructions of the wireless IO device and dongle synchronized RX/TX switching system may ensure that the wireless communication dongle or information handling system does not undergo an RX ramp up in between receipt of wireless IO device data packets. As such, the wireless communication dongle or information handling system may be immediately capable of receiving a next data packet during a period of time in between receipt of wireless IO device data packets in which the wireless IO device is undergoing a mandatory TX ramp up process. Skipping the RX ramp up process at the wireless communication dongle or information handling system while the wireless IO device is undergoing a TX ramp up process may ensure that the wireless communication dongle or information handling system is ready to receive at least 40 microseconds (or the duration of the TX ramp up process at the wireless IO device) before the next wireless IO device data packet is transmitted.

At block 602, the controller at the wireless communication dongle or information handling system in an embodiment may execute code instructions of the wireless IO device and dongle synchronized receive/transmit (RX/TX) switching system to set duration of a communication frame transmission timer. As described herein in an embodiment with respect to FIG. 3, for example, expiration of the communication frame transmission timer 390 may trigger the wireless radio system of the wireless communication dongle 330, information handling system 300, or wireless IO device 380 to switch RX/TX modes at the end of a data packet communication frame before the controller at the wireless communication dongle 330 or information handling system 300 or the microcontroller at the wireless IO device 380 can reenable transmission or reception as if the frame is still continuing. As another example, in an embodiment described with respect to FIG. 4, the duration of the communication frame transmission timer 490 may be identified within the initial polling packet 403, and may be set to terminate at a detected end of transmission or reception at time 481 of the last wireless IO device data packet 423 of the selected number of wireless IO data packets as also defined within the initial polling packet 403.

The wireless radio at the wireless communication dongle or information handling system in an embodiment at block 604 may perform a TX ramp up process to prepare to transmit a polling packet. For example, the wireless communication dongle 330 or information handling system 300 in an embodiment may be placed in a transmit (TX) mode at 301 for transmission of the initial polling packet 303 to the wireless IO device 380. At 302, following the TX ramp up period between 301 and 302, the wireless communication dongle 330 or the information handling system 300 may be ready to transmit.

At block 606, the wireless communication dongle or information handling system radio in an embodiment may transmit a polling packet to a wireless IO device identifying allotted time slots to occur after a TX ramp up process at the wireless communication dongle and the RX ramp up period at the wireless IO device. The controller of the wireless communications dongle 330 or the information handling system 300 integrated wireless radio system executing code instructions of the IO device wireless communication polling and packet frame system in an embodiment may generate an initial polling packet 303 that instructs each of the wireless IO devices (e.g., 380) paired with the wireless communications dongle 330 or the information handling system 300 to transmit a selected number of wireless IO device data packets (e.g., N) of a selected data packet length and at specified allotted time slots during a first data packet communication frame 320. The data packet communication frame 320 is transmitted between each of the paired wireless IO devices (e.g., 380) and the wireless communications dongle 330 or the information handling system 300. The initial polling packet 303 in an embodiment may also thus provide a time for the end at time 381 of the data packet communication frame 320 and the duration of the communication frame timer 390. At 302 of FIG. 3, the wireless radio system for the wireless communications dongle 330 or information handling system 300 may begin transmission of the initial polling packet 303 to the wireless IO device 380.

The controller at the wireless communications dongle 330 or information handling system 300 may execute code instructions of the wireless IO device and dongle synchronized RX/TX switching system to ensure that the wireless radio for the wireless communications dongle 330 or information handling system 300 is ready to receive data before the scheduled transmission of any of the selected number of wireless IO device data packets (e.g., 321 to 322), as identified within the initial polling packet 303. In order to achieve this synchronization, the wireless radio system of the wireless communication dongle 330 or information handling system 300 in an embodiment may set the first allotted time slot within an upcoming data packet communication frame 320 to begin at time 387. The time 387 marks a period of time after the end of transmission of the initial polling packet 303 that is greater than the duration 305 of the RX ramp up process for the wireless communication dongle 330 or information handling system 300 and at or greater than the duration 386 of the TX ramp up process for the wireless IO device 380 (which may be known to the wireless communication dongle 330 or information handling system 300 following pairing of the two devices).

The wireless radio system of the wireless communication dongle or information handling system in an embodiment at block 608 may detect an end of transmission of the polling packet to the wireless IO device and begin a RX ramp up process to switch the wireless dongle to receive a data packet communication frame. For example, the wireless dongle radio system for the wireless communications dongle 330 or information handling system 300 may detect the end of the transmission of the initial polling packet 303 at time 304, prompting the controller executing code instructions of the wireless IO device and dongle synchronized RX/TX switching system to instruct the wireless dongle radio system of the wireless communications dongle 330 or information handling system 300 to switch from the TX mode to the RX mode for receipt of the selected number of wireless IO device data packets within the data packet communication frame 320. In some embodiments, the duration 305 of the RX ramp up process for the wireless communication dongle 330 or information handling system 300 may be set or programmed to be less than the duration 386 of the TX ramp up process for the wireless IO device 380 in order to ensure that the wireless communication dongle 330 or information handling system 300 completes the RX ramp up process and is ready to receive at 305 prior to time 387 where completion of the TX ramp up process 386 at the wireless IO device 380 coincides with receiving first wireless IO device data packet 321. This may occur even when both ramp up processes are triggered by the same event, such as the detected end of receipt or transmission 304 of the initial polling packet 303 in an embodiment.

The microcontroller for the wireless communication dongle or information handling system may also execute code instructions of the wireless IO device and dongle synchronized RX/TX switching system at block 608 to start running of the communication frame transmission timer. For example, the end of transmission of the polling packet 303 may trigger the communication frame transmission timer 390 at the wireless communication dongle 330. The initial polling packet in an embodiment may include a communication frame transmission timer 390 that triggers switching of the wireless radio system RX/TX modes upon its expiration. This expiration of the communication frame transmission timer 390 may trigger the wireless radio system of the wireless communication dongle 330, information handling system 300, or wireless IO device 380 to switch RX/TX modes before the controller at the wireless communication dongle 330 or information handling system 300 or the microcontroller at the wireless IO device 380 can reenable transmission or reception at those devices.

As another example, in an embodiment described with respect to FIG. 4, a detected end of transmission at 404 for the polling packet at 403 by the wireless radio system of the wireless communication dongle 430 or information handling system 400 may start a communication frame transmission timer 490 at the wireless communication dongle 430 or information handling system 400. The duration of the communication frame transmission timer 490 may be identified within the initial polling packet 403, and may be set to terminate at a detected end of transmission or reception at time 481 of the last selected number of wireless IO data packets (e.g., 423), as defined within the initial polling packet 403.

At block 610, the wireless communication dongle or information handling system radio may perform an RX ramp up process in an embodiment. For example, in an embodiment described with respect to FIG. 3, the wireless communication dongle 330 or information handling system 300 radio may perform a RX ramp up process between time 301 and time 302. This may ensure that the wireless communication dongle 330 or information handling system 300 is prepared to receive the first data packet 321 at 387, at the scheduled beginning of the data packet communication frame 320, as identified within the initial polling packet 303.

The wireless communication dongle or information handling system radio in an embodiment may begin receipt of a first data packet within a data packet communication frame at block 612, at the beginning of a first allotted time slot identified in the transmitted polling packet. At the time specified within the initial polling packet 303 in an embodiment, the data packet communication frame 320 may begin with receipt at the wireless communication dongle 330 or information handling system 300 of a first wireless IO device data packet 321 responsive to the initial polling packet 303 from the wireless IO device 380 at data packet communication frame start time 387. In an embodiment, the first packet 321 for the data packet communication frame 320 may adhere to the instructions received within the initial polling packet 303. For example, in an embodiment, the first packet 321 may have a length equivalent to the wireless IO device data packet length of defined in the initial polling packet 303 and may be delivered at the synchronized time (e.g., 387). Data packet communication frame start time 387 designates the beginning of the data packet communication frame 320 within the first of N wireless IO device allotted data packet transmission time slots, as defined within the initial polling packet 303. It is understood that the communication frame transmission timer duration 390 begins however at the detected end of the polling packet transmission at time 304.

At block 614, the controller for the wireless communication dongle or information handling system may execute code instructions of the wireless IO device and dongle synchronized RX/TX switching system to read a data buffer, and to trigger an end transmission event, which may further trigger a scheduled, registered, programmed, or subscribed interrupt call back routine to override a command to disable the receiver upon a detected end of transmission of a data packet. In an embodiment, the controller at the wireless communications dongle 430 or information handling system 400 executing code instructions of the wireless IO device and dongle synchronized RX/TX switching system may avoid unnecessary RX ramping at the wireless communication dongle 430 or information handling system 400. For example, the controller at the wireless communications dongle 430 or information handling system 400 executing code instructions of the wireless IO device and dongle synchronized RX/TX switching system may trigger an end transmission event at 488, immediately upon a detected end of receipt of the wireless IO device data packet 421 at the wireless communication dongle 430 or information handling system 400. The end transmission event may further trigger a scheduled, registered, programmed, or subscribed interrupt call back routine at 488 which may override a command to disable the receiver at the wireless communication dongle 430 or information handling system 400. This may avoid initiation of an RX ramp up. As such, the wireless communication dongle 430 or information handling system 400 may be immediately capable of receiving a next data packet (e.g., 422) during a period of time in between receipt of the first wireless IO device data packet 421 and transmission of the second wireless IO device data packet 422, in which the wireless IO device 480 is undergoing a mandatory TX ramp up process 491. Skipping the RX ramp up process at the wireless communication dongle 430 or information handling system 400 while the wireless IO device 480 is undergoing a TX ramp up process at 491 of roughly 40 microseconds or more may ensure that the wireless communication dongle 430 or information handling system 400 is ready to receive at 488, at least 40 microseconds (or the duration of the TX ramp up process 491 at the wireless IO device) before the second wireless IO device data packet 422 is transmitted. In fact, this omission of the RX ramp up process at the wireless communication dongle 430 or information handling system 400 may afford the wireless communication dongle 430 or information handling system 400 enough time in an embodiment to read a payload of the wireless IO device data packet 421 into memory from the data buffer in between receipt of the first wireless IO device data packet 421 and the second wireless IO device data packet 422.

The controller executing code instructions of the wireless IO device and dongle synchronized RX/TX switching system in an embodiment at block 616 may determine whether a communication frame transmission timer has expired. As described herein, the wireless IO device and dongle synchronized RX/TX switching system and agent in an embodiment may allow the wireless radio systems of the wireless communication dongle 430, information handling system 400, or wireless IO device 480 the necessary time to power up receivers or transmitters upon actual switching RX/TX modes, such as for polling packets or at the beginning or end of the data packet communication frame 420. For example, the initial polling packet in embodiments described herein may include a communication frame transmission timer 490 that triggers switching of the wireless radio system RX/TX modes upon its expiration. This essentially initiates the RX/TX mode switch before the controller at the wireless communication dongle 430 or information handling system 400 can reenable further reception since the wireless IO device data packets have ended from the most recent data packet communication frame.

The communication frame transmission timer 490 in an embodiment may be set to terminate at a detected end of transmission or reception at time 481 of the last wireless IO device data packet 423 of the selected number of wireless IO data packets of the data packet communication frame, as defined within the initial polling packet 403. For example, the duration for the communication frame transmission timer 490 may be set at the wireless communication dongle 430 or information handling system 400 to the period of time between the detected end of transmission at 404 for the initial polling packet 403 and the end 481 of receipt of the last data packet 423 within the data packet communication frame 420.

If the communication frame transmission timer has expired at block 616, this may indicate that all of the allotted time slots for transmission of data packets within the current data packet communication frame have passed, and the wireless communication dongle or information handling system needs to switch from RX to TX mode to transmit an updated polling packet providing instructions for the next data packet communication frame. The method may then proceed to block 620. If the communication frame transmission timer has not yet expired, this may indicate that there are remaining time slots for further transmission of data packets within the current data packet communication frame, and the wireless communication dongle or information handling system may need to remain in an RX mode to receive such transmissions of the remaining wireless IO device data packets in the data packet communication frame. The method may then proceed to block 618 for such later receipts.

At block 618, the controller of the wireless communication dongle or information handling system in an embodiment at block may execute code instructions of the wireless IO device and dongle synchronized RX/TX switching system to begin receipt of the next wireless IO device data packet. For example, the controller of the wireless communications dongle 430 or information handling system 400 may execute code instructions of the wireless IO device and dongle synchronized RX/TX switching system to receive the second data packet 422 at 489, via the wireless radio system. The method may then return to block 614 for overriding a command to disable the receiver for a brief period in between multiple data packets received within the same data packet communication frame.

At block 620, in an embodiment in which the communication frame transmission timer has expired, the controller of the wireless communication dongle or information handling system may execute code instructions of the wireless IO device and dongle synchronized RX/TX switching system to switch the wireless communication dongle or information handling system radio to a TX mode and begin a TX ramp up process. For example, expiration of the communication frame transmission timer 490 in an embodiment may trigger a switching command to be issued by the controller of the wireless communication dongle 430 or information handling system 400 executing code instructions of the wireless IO device and dongle synchronized RX/TX switching system. More specifically, upon expiration of the communication frame transmission timer 490 at 481, the controller of the wireless communication dongle 430 or information handling system 400 executing code instructions of the wireless IO device and dongle synchronized RX/TX switching system may issue a command to switch the wireless dongle radio system from an RX mode to a TX mode. This command may cause the wireless dongle radio system to disable receiving and begin a TX ramp up process period 401. At time 402, the wireless IO device 480 may be prepared to receive and the wireless communication dongle 430 or information handling system 400 in an embodiment may be prepared to transmit the updated polling packet 407.

The commanded switching of the wireless radio system of the wireless communication dongle 430 or information handling system 400 to a TX mode for transmission of an updated polling packet 407 occurs before the controller at the wireless communication dongle 430 or information handling system 400 can reenable reception of further data packets from the wireless IO device 480. In such a way, the wireless IO device and dongle synchronized RX/TX switching system in embodiments herein may ensure that, following completion of each data packet communication frame (e.g., 420) at time 481, the wireless communication dongle 430 or information handling system 400 switches from an RX mode to a TX mode to transmit an updated polling packet 407 for the next data packet communication frame.

The controller of the wireless communication dongle or information handling system in an embodiment at block 622 may determine whether the wireless communication dongle or information handling system has powered down. If the wireless communication dongle or information handling system has not powered down in an embodiment, the method may proceed to block 606 for transmission of an updated polling packet to the wireless IO device instructing transmission of more wireless IO data packets during a second wireless communication data frame. For example, the controller for the wireless communication dongle 430 or information handling system 400 in an embodiment may execute code instructions of the IO device wireless communication polling and packet frame system to generate and transmit an updated polling packet 407. By repeating the loop between blocks 606 and 622, the wireless communication dongle or information handling system may decrease ramp up period delays between receipts of multiple data packets within a communication frame at a wireless communication dongle or information handling system while ensuring rapid switching from RX to TX modes following communications frames. If the wireless communication dongle or information handling system has powered down in an embodiment, there may be no need or no capability to transmit further polling packets to the wireless IO device, and the method may then end.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless input/output (IO) device and dongle synchronized receive (RX)/transmit (TX) switching agent executing on a wireless IO device in wireless communication with a wireless communication dongle at an information handling system comprising:
 a microcontroller to execute code instructions of the wireless IO device and dongle synchronized RX/TX switching agent to receive, with a wireless IO device radio system, an initial polling packet from the wireless communication dongle instructing transmission by the wireless IO device of a selected number of wireless IO device data packets, having a selected length, within a plurality of wireless IO device allotted time slots of a data packet communication frame;
 the microcontroller to execute code instructions, upon an initial polling packet detected end of receipt identified by the wireless IO device radio system, to initiate a first TX ramp up process at the wireless IO device radio system, and set a communication frame transmission timer;

the microcontroller to execute code instructions, upon a first wireless IO device data packet detected end of transmission identified by the wireless radio system, to disable transmission at the wireless IO device radio system, and start a TX radio interrupt callback timer; and the microcontroller to execute code instructions, upon running of the TX radio interrupt callback timer, to initiate a second TX ramp up period that concludes at or after a scheduled initiation of a next allotted time slot for transmission of a second wireless IO device data packet within the data packet communication frame to reenable immediate transmission to transmit the second wireless IO device data packet in the data packet communication frame.

2. The wireless IO device and dongle synchronized RX/TX switching agent executing on the wireless IO device of claim 1, wherein a first of the plurality of wireless IO device allotted time slots is set to occur a period of time after the identified initial polling packet detected end of receipt that is greater than the first TX ramp up period for the wireless IO device and greater than a RX ramp up period for the wireless communication dongle.

3. The wireless IO device and dongle synchronized RX/TX switching agent executing on the wireless IO device of claim 1, wherein a duration of the TX radio interrupt callback timer is greater than one microsecond.

4. The wireless IO device and dongle synchronized RX/TX switching agent executing on the wireless IO device of claim 1, wherein the duration of the TX radio interrupt callback timer is equal to or greater than a determined duration of time between the first wireless IO device data packet detected end of transmission and the scheduled initiation of the next allotted time slot for transmission of the second wireless IO device data packet.

5. The wireless IO device and dongle synchronized RX/TX switching agent executing on the wireless IO device of claim 1, wherein a disable delay timer is set to zero and the first TX ramp up process at the wireless IO device radio system initiates immediately upon the first wireless IO device data packet detected end of transmission detected by the wireless IO device radio system.

6. The wireless IO device and dongle synchronized RX/TX switching agent executing on the wireless IO device of claim 1, wherein the wireless IO device communicates with the operatively coupled wireless communication dongle via a wireless link established according to the Bluetooth® Low Energy (BLE) radio layer protocol.

7. The wireless IO device and dongle synchronized RX/TX switching agent executing on the wireless IO device of claim 1 further comprising:

the microcontroller to disable transmission upon a detected end of transmission for a last one of the selected number of wireless IO device data packets;

the microcontroller to determine, prior to running of a last TX radio interrupt callback timer, that the communication frame transmission timer has expired; and the wireless IO device radio system to switch to RX mode for receipt of an updated polling packet from the wireless communication dongle.

8. A method of synchronizing receive/transmit (RX/TX) switching at a wireless input/output (IO) device with a wireless communication dongle of an information handling system comprising:

receiving, with a wireless IO device radio system of the wireless IO device, an initial polling packet from the wireless communication dongle instructing transmission by the wireless IO device of a selected number of wireless IO device data packets and a selected length of wireless IO device data packets within a plurality of wireless IO device allotted time slots of a data packet communication frame and identifying a communication frame transmission timer duration;

initiating a communication frame transmission timer, via a microcontroller, upon identification of an initial polling packet detected end of receipt by the wireless IO device radio system;

disabling transmission at the wireless IO device radio system, via the microcontroller, upon a detected end of transmission for a last wireless IO device data packet of the selected number of wireless IO device data packets in the data packet communication frame;

determining, via the microcontroller, prior to running of a TX radio interrupt callback timer after transmission of the last wireless IO device data packet, that the communication frame transmission timer has expired; and instructing the wireless IO device radio system, via the microcontroller, to switch to RX mode for receipt of an updated polling packet from the wireless communication dongle.

9. The method of claim 8, wherein the communication frame transmission timer duration is equivalent to a set TX ramp duration of the single TX ramp up process for the wireless IO device in addition to a duration of transmission of the data packet communication frame, as identified within the initial polling packet.

10. The method of claim 8, wherein the TX radio interrupt callback timer is greater than one microsecond.

11. The method of claim 8, wherein the duration of the TX radio interrupt callback timer is equal to or greater than a determined duration of time between the first wireless IO device data packet detected end of transmission and the scheduled initiation of the next allotted time slot for transmission of the second wireless IO device data packet.

12. The method of claim 8, wherein a disable delay timer is set to zero and an RX ramp up process at the wireless IO device radio system initiates immediately upon the detected end of transmission for a last one of the selected number of wireless IO device data packets.

13. The method of claim 8, wherein the wireless IO device communicates with the operatively coupled wireless communication dongle via a wireless link established according to the Bluetooth® Low Energy (BLE) radio layer protocol.

14. The method of claim 8 further comprising:

setting a duration of the TX ramp up process at the wireless IO device radio system of the wireless IO device, via the microcontroller, to be greater than a known duration of a RX ramp up process at the wireless communication dongle.

15. A wireless input/output (IO) device and dongle synchronized receive/transmit (RX/TX) switching system executing at a wireless communication dongle of an information handling system comprising:

a microcontroller to execute code instructions of the wireless IO device and dongle synchronized RX/TX switching system to transmit with a wireless dongle radio system an initial polling packet instructing transmission by the wireless IO device of a selected number of wireless IO device data packets, having a selected length, within a plurality of wireless IO device allotted time slots of a data packet communication frame and identifying a communication frame transmission timer duration;

the microcontroller to execute code instructions, upon identification of an initial polling packet detected end of transmission by the wireless dongle radio system, to initiate a first RX ramp up process at the wireless dongle radio system, and start a communication frame transmission timer; and the microcontroller to execute code instructions, upon a detected end of receipt of a first wireless IO device data packet among the selected number of wireless IO device data packets identified by the wireless dongle radio system, to override a command to disable receiving at the wireless dongle radio system, to immediately enable receipt at the wireless dongle radio system of a second wireless IO device data packet in the data packet communication frame.

16. The wireless IO device and dongle synchronized RX/TX switching system executing on the wireless communication dongle of claim 15 further comprising:

the microcontroller to execute code instructions, upon a first wireless IO device data packet detected end of receipt identified by the wireless dongle radio system, to read data packet payload information from a data buffer for the wireless communication dongle.

17. The wireless IO device and dongle synchronized RX/TX switching system executing on the wireless communication dongle of claim 15 further comprising:

the microcontroller to execute code instructions to instruct the wireless dongle radio system to perform a single RX ramp up process for receipt of all of the selected number of wireless IO device data packets after the initial polling packet detected end of transmission by the wireless dongle radio system.

18. The wireless IO device and dongle synchronized RX/TX switching system executing on the wireless communication dongle of claim 15, wherein the communication frame transmission timer is at least a known TX ramp duration of a TX ramp up process for the wireless IO device in addition to a data packet communication frame duration, as identified within the initial polling packet.

19. The wireless IO device and dongle synchronized RX/TX switching agent executing on the wireless IO device of claim 15, wherein the wireless IO device communicates with the operatively coupled wireless communication dongle via a wireless link established according to the Bluetooth® Low Energy (BLE) radio layer protocol.

20. The wireless IO device and dongle synchronized RX/TX switching system executing on the wireless communication dongle of claim 15 further comprising:

the microcontroller to disable transmission upon a detected end of receipt for a last wireless IO device data packets of the selected number of wireless IO device data packets in the data packet communication frame;

the microcontroller to determine that the communication frame transmission timer has run; and the wireless dongle radio system to switch to TX mode for transmission of an updated polling packet from the wireless communication dongle.

* * * * *